United States Patent
Sakai et al.

(10) Patent No.: US 10,540,775 B2
(45) Date of Patent: Jan. 21, 2020

(54) POROUS BODY, HONEYCOMB FILTER, MICROSTRUCTURE ANALYSIS METHOD, PROGRAM FOR SAME, AND MICROSTRUCTURE ANALYZER

(71) Applicant: NGK INSULATORS, LTD., Nagoya (JP)

(72) Inventors: Ayaka Sakai, Nagoya (JP); Satoshi Sakashita, Yokkaichi (JP); Shingo Sokawa, Anjyo (JP); Yuichi Tajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 234 days.

(21) Appl. No.: 15/467,069

(22) Filed: Mar. 23, 2017

(65) Prior Publication Data
US 2017/0287155 A1    Oct. 5, 2017

(30) Foreign Application Priority Data
Mar. 31, 2016  (JP) .................... 2016-070889

(51) Int. Cl.
*G06T 7/60* (2017.01)
*B01D 46/24* (2006.01)
(Continued)

(52) U.S. Cl.
CPC ............. *G06T 7/60* (2013.01); *B01D 46/247* (2013.01); *B01D 46/2474* (2013.01);
(Continued)

(58) Field of Classification Search
None
See application file for complete search history.

(56) References Cited

U.S. PATENT DOCUMENTS 8,657,914 B2 * 2/2014 Tanaka ............... B01D 46/2429
422/169
2006/0135343 A1   6/2006 Ohno et al.
(Continued)

FOREIGN PATENT DOCUMENTS

| EP | 2 927 673 B1 | 11/2017 |
| JP | 2016-199450 A1 | 12/2016 |
| WO | 2006/001509 A1 | 1/2006 |

OTHER PUBLICATIONS

German Office Action (Application No. 10 2017 002 851.6) dated May 7, 2018 (with English translation).

*Primary Examiner* — Amber R Orlando
(74) *Attorney, Agent, or Firm* — Burr & Brown, PLLC

(57) ABSTRACT

In a porous body, a surface layer thickness Ts takes a relatively small value satisfying P≥0.54 Ts (formula (1)), the surface layer thickness Ts being derived by a microstructure analysis using the porous-body data that is prepared through three-dimensional scanning of a region including a surface (inflow plane 61) of the porous body. Here, P denotes a porosity [%] of the porous body, and 0%<P<100% and 0 μm<Ts are assumed. The surface layer thickness Ts is derived as a distance in a thickness direction (X direction) between a surface-layer region start plane 92 in which a straight-pore opening ratio becomes 98% or less for the first time and a surface-layer region end plane 93 in which the straight-pore opening ratio becomes 1% or less for the first time.

5 Claims, 12 Drawing Sheets

(51) Int. Cl.
    *C04B 38/00*         (2006.01)
    *F01N 3/022*        (2006.01)
    *C04B 28/24*         (2006.01)
    *C04B 35/195*       (2006.01)
    *C04B 111/00*       (2006.01)

(52) U.S. Cl.
    CPC ............ C04B 28/24 (2013.01); C04B 35/195 (2013.01); C04B 38/0006 (2013.01); F01N 3/022 (2013.01); *B01D 2046/2433* (2013.01); *B01D 2046/2481* (2013.01); *B01D 2046/2496* (2013.01); *B01D 2279/30* (2013.01); *C04B 2111/0081* (2013.01); *C04B 2111/00793* (2013.01); *C04B 2235/3217* (2013.01); *C04B 2235/3244* (2013.01); *C04B 2235/349* (2013.01); *F01N 2330/06* (2013.01); *G06T 2200/04* (2013.01); *Y02T 10/20* (2013.01)

(56) References Cited

U.S. PATENT DOCUMENTS

| | | |
|---|---|---|
| 2015/0278602 A1 | 10/2015 | Sakashita et al. |
| 2016/0307318 A1 | 10/2016 | Sakai et al. |

\* cited by examiner

Fig. 6

| X COORDINATE | Y COORDINATE | Z COORDINATE | TYPE INFORMATION |
|---|---|---|---|
| 1 | 1 | 1 | 0 |
| 2 | 1 | 1 | 0 |
| 3 | 1 | 1 | 0 |
| 4 | 1 | 1 | 9 |
| 5 | 1 | 1 | 0 |
| 6 | 1 | 1 | 9 |
| 7 | 1 | 1 | 9 |
| ⋮ | ⋮ | ⋮ | ⋮ |
| 250 | 400 | 400 | 9 |

| INFLOW PLANE | OUTFLOW PLANE |
|---|---|
| X=1 | X=251 |

LINEAR LINE L1: P=0.54Ts
LINEAR LINE L2: P=0.63Ts

POROUS BODY, HONEYCOMB FILTER, MICROSTRUCTURE ANALYSIS METHOD, PROGRAM FOR SAME, AND MICROSTRUCTURE ANALYZER

BACKGROUND OF THE INVENTION

1. Field of the Invention

The present invention relates to a porous body, a honeycomb filter, a microstructure analysis method, a program for the microstructure analysis method, and a microstructure analyzer.

2. Description of the Related Art

It is known to use a porous body in a member, such as a honeycomb filter, for cleaning exhaust gas. For example, Patent Literature (PTL) 1 discloses a porous body manufacturing method of mixing ceramic particles, fine particles, and a sintering aid to prepare clay, forming the clay into a compact, and firing the compact at a predetermined firing temperature. The above porous body manufacturing method is explained as being able to manufacture a porous body in which an increase of pressure loss is suppressed with an average particle size of the ceramic particles being set to a value within a predetermined range.

CITATION LIST

Patent Literature

PTL 1: WO 2006/001509 A1

SUMMARY OF THE INVENTION

The above-mentioned porous body preferably has as high as a capability of trapping particulate matter (PM) in the exhaust gas. Furthermore, the pressure loss is preferably low even after deposition of PM (namely, after trapping PM). Thus, there has been a demand for a porous body that has a higher trapping capability, and that exhibits a smaller pressure loss even after the PM deposition.

The present invention has been made to solve the above-mentioned problem, and a main object of the present invention is to provide a porous body and a honeycomb filter in which a trapping capability is increased, and in which a pressure loss after deposition of PM is reduced.

To achieve the above main object, the present invention is constituted as follows:

In a porous body according to the present invention, when porous-body data in which positional information providing a position of a voxel is associated with voxel type information including information that allows determination as to whether the voxel is a spatial voxel representing a space or an object voxel representing an object is prepared through three-dimensional scanning of a region including a surface of the porous body, and when the region including a surface of the porous body, and when the following steps are performed using the porous-body data;

(a) a step of defining an imaginary surface that is in contact with at least one object voxel present in the surface of the porous body, (b) a step of identifying, as surface layer straight-pore voxels, spatial voxels in contact with the imaginary surface and spatial voxels that continuously lie from the imaginary surface toward an inside of the porous body in a thickness direction, which is perpendicular to the imaginary surface and which extends toward the inside of the porous body, and (c) a step of successively shifting the imaginary surface in the thickness direction to define the imaginary surface after each shift as an imaginary reference surface, identifying, as a surface-layer region start plane, an imaginary reference plane in which a straight-pore opening ratio denoting a proportion of the surface layer straight-pore voxels occupying the imaginary reference surface becomes 98% or below for the first time, identifying, as a surface-layer region end plane, an imaginary reference plane in which the straight-pore opening ratio becomes 1% or below for the first time, and deriving, as a surface layer thickness Ts, a distance between the surface-layer region start plane and the surface-layer region end plane in the thickness direction, the derived surface layer thickness Ts [μm] and a porosity P [%] of the porous body satisfy a following formula (1):

$$P \geq 0.54 \, Ts \tag{1}$$

(where 0%<P<100% and 0 μm<Ts)

In the porous body, since the surface layer thickness Ts takes a comparatively small value satisfying the formula (1), the trapping capability is increased and the pressure loss after the PM deposition is reduced. Here, the surface layer thickness Ts corresponds to a length of a surface layer region in the thickness direction, which region is determined in a manner of identifying, as the surface layer straight-pore voxels, the spatial voxels indicating a straight-pore portion, i.e., a portion of pores in the porous body, the portion linearly extending from an opening at the surface of the porous body in the thickness direction, and then determining the surface layer region on the basis of a region where the identified surface layer straight-pore voxels are present. Thus, there is a tendency that a value of the surface layer thickness Ts increases in the porous body in which the straight pores extend up to inner deeper positions from the surface openings. The inventors have found that, as the value of the surface layer thickness Ts increases, the trapping capability tends to reduce and the pressure loss after the PM deposition tends to increase. The reason is presumably as follows. First, in a porous body having a larger value of the surface layer thickness Ts, i.e., a porous body in which the straight pores extend up to inner deeper positions from the surface openings, when a fluid flows into the porous body from its surface, PM in the fluid is not so trapped near the surface of the porous body, and tends to enter until the inner deeper positions of the porous body. It is hence thought that, in the porous body having a larger value of the surface layer thickness Ts, PM tends to penetrate through the porous body without being trapped, and the trapping capability tends to reduce. Moreover, with the lapse of time from the start of inflow of the fluid, PM is gradually deposited inside the porous body. On that occasion, because PM relatively easily penetrates through the surface layer region as described above, PM tends to first deposit near a boundary between the surface layer region and a region downstream of the surface layer region. With the further lapse of time thereafter, there is a tendency that a region where PM is deposited increases toward the surface side of the surface layer region from the vicinity of the above-mentioned boundary. Consequently, the PM deposition mostly occurs in the surface layer region of the porous body, and a total amount of deposited PM tends to increase in the porous body having a larger value of the surface layer thickness Ts. It is hence thought that the pressure loss after the PM deposition tends to increase in the porous body having a larger value of the surface layer thickness Ts. Thus, it is thought that the trapping capability can be increased and the pressure loss after the PM deposition can be reduced by setting the surface layer thickness Ts of the porous body to a relatively small value satisfying the formula (1) as described above. As seen from the formula (1), an upper limit value of the appropriate surface layer thickness Ts increases as the porosity P of the porous body increases. This is presumably attributable to the fact that, even when PM is deposited in the surface layer region, an influence upon an increase of the pressure loss is smaller when the porosity P of the porous body has a higher value.

The porous body may satisfy the following formula (2). In the porous body in which a value of the surface layer thickness Ts is even smaller as in this case, the trapping capability is further increased and the pressure loss after the PM deposition is further reduced.

$$P \geq 0.63 \text{ Ts} \quad (2)$$

In the porous body according to the present invention, $25\% \leq P \leq 70\%$ may be satisfied. When the porosity P is 25% or more, the porous body having such a value of the porosity P is relatively easy to manufacture. When the porosity P is 70% or less, the strength of the porous body can be increased sufficiently.

A honeycomb filter according to the present invention includes partitions each of which includes the porous body according to any one of the above-described embodiments, and which form a plurality of cells serving as paths of a fluid, and a surface of the porous body constitutes an inflow plane through which the fluid flows into the partition from the cell. Stated in another way, in the honeycomb filter according to the present invention, the surface layer thickness Ts, which is derived by executing the above-mentioned steps (a) to (c) using the porous-body data that is prepared through three-dimensional scanning of a region of the surface of the porous body constituting the partitions, the region including the inflow plane, and the porosity P satisfy the formula (1). In the honeycomb filter, therefore, the trapping capability is increased and the pressure loss after the PM deposition is reduced when the fluid flows into the porous body through the inflow plane.

A microstructure analysis method according to the present invention uses porous-body data in which positional information providing a position of a voxel is associated with voxel type information including information that allows determination as to whether the voxel is a spatial voxel representing a space or an object voxel representing an object, the porous-body data being prepared through three-dimensional scanning of a region including a surface of the porous body, the microstructure analysis method including:

(a) a step of defining an imaginary surface that is in contact with at least one object voxel present in the surface of the porous body;

(b) a step of identifying, as surface layer straight-pore voxels, spatial voxels in contact with the imaginary surface and a predetermined number or more of spatial voxels that continuously lie from the imaginary surface toward an inside of the porous body in a predetermined thickness direction, or a step of identifying, as the surface layer straight-pore voxels, the predetermined number or more of spatial voxels that continuously lie from the imaginary surface toward the inside of the porous body in the predetermined thickness direction; and (c) a step of deriving, as a surface layer thickness Ts, a length of a surface layer region in the thickness direction, the surface layer region being determined on the basis of a region where the identified surface layer straight-pore voxels are present.

According to the microstructure analysis method described above, spatial voxels representing a straight-pore portion, i.e., a portion of pores in the porous body, the portion linearly extending from an opening at the surface of the porous body in the thickness direction, are identified as the surface layer straight-pore voxels, and the surface layer thickness Ts is derived as a length of a surface layer region in the thickness direction, the surface layer region being determined on the basis of a region where the identified surface layer straight-pore voxels are present. Since the surface layer thickness Ts is correlated with the trapping capability and the pressure loss after the PM deposition as described above, the microstructure of the porous body can be analyzed on the basis of the derived surface layer thickness Ts. In such a case, the microstructure analysis method according to the present invention may include a step of analyzing the microstructure of the porous body on the basis of the derived surface layer thickness Ts.

In the microstructure analysis method according to the present invention, the above step (c) may include processes of successively shifting the imaginary surface in the thickness direction to define the imaginary surface after each shift as an imaginary reference surface, identifying, as a surface-layer region start plane, an imaginary reference plane in which a straight-pore opening ratio denoting a proportion of the surface layer straight-pore voxels occupying the imaginary reference surface takes a predetermined first opening ratio, and deriving the surface layer thickness Ts without including, in the surface layer region, a region on the side closer to the imaginary surface than the surface-layer region start plane. Here, because there are irregularities on the actual surface of the porous body, the surface layer straight-pore voxels near the imaginary surface may often include, as noise, spatial voxels that represent spaces outside the porous body (i.e., spaces not so affecting the trapping capability and the pressure loss) instead of the pores in the porous body. The surface layer thickness Ts can be derived in a way of excluding (ignoring) the spatial voxels, which exist near the imaginary surface and generate noise, by identifying, as the surface-layer region start plane, the imaginary reference plane after the shift of the imaginary surface with the first opening ratio used as a threshold so that the region on the side closer to the imaginary surface than the surface-layer region start plane is not included in the surface layer region. Hence the correlation between the surface layer thickness Ts and each of the trapping capability of the porous body and the pressure loss after the PM deposition is further increased, and the microstructure of the porous body can be analyzed with higher accuracy. The first opening ratio is a value less than 100%. In this case, the first opening ratio may be a value in a range of less than 100% and 97% or more. By setting the first opening ratio to 97% or more, the possibility of excluding even the surface layer straight-pore voxels which represent pores providing a large influence upon the trapping capability and the pressure loss can be reduced, and the surface layer thickness Ts exhibiting the above-described correlation at a higher level can be derived.

In the microstructure analysis method according to the present invention, the step (c) may include processes of successively shifting the imaginary surface in the thickness direction to define the imaginary surface after each shift as an imaginary reference surface, identifying, as a surface-layer region end plane, an imaginary reference plane in which a straight-pore opening ratio denoting a proportion of the surface layer straight-pore voxels occupying the imaginary reference surface takes a predetermined second opening ratio, and deriving the surface layer thickness Ts without including, in the surface layer region, a region on the inner side of the porous body than the surface-layer region end plane. Here, for example, when the surface layer straight-pore voxels extend in a single line up to the inner deep side of the porous body, an influence upon the trapping capability and the pressure loss by only those surface layer straight-pore voxels extending in a single line is small. Accordingly, if such a region where the surface layer straight-pore voxels are rarely present is regarded as being included in the surface layer region, the correlation between the derived surface layer thickness Ts and each of the trapping capability of the porous body and the pressure loss after the PM deposition would be reduced. Thus, the surface layer thickness Ts can be derived in a way of excluding (ignoring) such a very small number of surface layer straight-pore voxels, which extend up to the inner deep side of the porous body, by identifying, as the surface-layer region end plane, the imaginary reference plane after the shift of the imaginary surface with the second opening ratio used as a threshold so that a region on the inner side of the porous body than the surface-layer region end plane is not included in the surface layer region. Hence the correlation between the surface layer thickness Ts and each of the trapping capability of the porous body and the pressure loss after the PM deposition is further increased, and the microstructure of the porous body can be analyzed with higher accuracy. The second opening ratio is a value more than 0%. In this case, the second opening ratio may be a value in a range of 10% or less and 0.5% or more. By setting the second opening ratio to 0.5% or more, the very small number of surface layer straight-pore voxels extending up to the inner deep side of the porous body can be excluded sufficiently, and the surface layer thickness Ts exhibiting the above-described correlation at a higher level can be derived. By setting the second opening ratio to 10% or less, the possibility of excluding even the surface layer straight-pore voxels which represent pores providing a large influence upon the trapping capability and the pressure loss can be reduced, and the surface layer thickness Ts exhibiting the above-described correlation at a higher level can be derived.

In the above case, the surface layer thickness Ts may be derived in above step (c) without including, in the surface layer region, the region on the side closer to the imaginary surface than the surface-layer region start plane, and without including, in the surface layer region, the region on the inner side of the porous body than the surface-layer region end plane in the thickness direction. Stated in another way, in above step (c), the surface-layer region start plane and the surface-layer region end plane may be identified, and a distance between the surface-layer region start plane and the surface-layer region end plane in the thickness direction may be derived as the surface layer thickness Ts.

In the microstructure analysis method according to the present invention, in the step (a), the imaginary surface may be defined as (i) a plane parallel to any one of an XY plane, an XZ plane, and a YZ plane in three-dimensional coordinates, or (ii) a plane which is in contact with three or more object voxels present in the surface of the porous body and in which a triangle formed by at least one set of three object voxels selected from the three or more object voxels includes a barycenter of the surface of the porous body. When the three-dimensional scanning is performed on the region including the surface of the porous body, the three-dimensional scanning is usually performed in a state that the relevant surface is arranged so as to be parallel to one of the XY plane, the XZ plane, and the YZ plane as much as possible. On that occasion, one of the XY plane, the XZ plane, and the YZ plane, the one being most parallel to the surface of the porous body, may be selected, and the imaginary surface may be defined to be parallel to the selected surface, as mentioned above in (i). In such a case, the predetermined thickness direction is preferably set to a direction perpendicular to the imaginary surface. When the surface of the porous body forms a certain angle relative to any one of the XY plane, the XZ plane, and the YZ plane, the imaginary surface is preferably defined as mentioned above in (ii). In that case, the predetermined thickness direction may be the direction perpendicular to the imaginary surface, or a direction of one axis (any of X, Y and Z axes) that is closest to the direction perpendicular to the imaginary surface.

A program according to the present invention causes one or more computers to execute individual steps in the microstructure analysis method according to any one of the above-described embodiments. The program may be recorded on a computer-readable storage medium (e.g., a hard disk, ROM, FD, CD, or DVD), or may be delivered from one computer to another computer via a transmission medium (communication network such as the Internet or LAN). Alternatively, the program may be sent and received in any one of other suitable ways. Since the individual steps in the microstructure analysis method are carried out by causing one computer to execute the program, or by causing a plurality of computers to execute the individual steps in a sharing mode, similar advantageous effects to those of the microstructure analysis method according to the present invention are obtained.

A microstructure analyzer according to the present invention includes:

a storage device for storing porous-body data in which positional information providing a position of a voxel is associated with voxel type information including information that allows determination as to whether the voxel is a spatial voxel representing a space or an object voxel representing an object, the porous-body data being prepared through three-dimensional scanning of a region including a surface of the porous body;

an imaginary surface definition device for defining, on the basis of the porous-body data, an imaginary surface that is in contact with at least one object voxel present in the surface of the porous body;

an identification device for identifying, as surface layer straight-pore voxels, spatial voxels in contact with the imaginary surface and a predetermined number or more of spatial voxels that continuously lie from the imaginary surface toward an inside of the porous body in a predetermined thickness direction, or identifying, as the surface layer straight-pore voxels, the predetermined number or more of spatial voxels that continuously lie from the imaginary surface toward the inside of the porous body in the predetermined thickness direction; and a surface layer thickness derivation device for deriving, as a surface layer thickness Ts, a length of a surface layer region in the thickness direction, the surface layer region being determined on the basis of a region where the identified surface layer straight-pore voxels are present.

According to the microstructure analyzer described above, spatial voxels representing a straight-pore portion, i.e., a portion of pores in the porous body, the portion linearly extending from an opening at the surface of the porous body in the thickness direction, are identified as the surface layer straight-pore voxels, and the surface layer thickness Ts is derived as a length of a surface layer region in the thickness direction, the surface layer region being determined on the basis of a region where the identified surface layer straight-pore voxels are present. Since the surface layer thickness Ts is correlated with the trapping capability and the pressure loss after the PM deposition as described above, the microstructure of the porous body can be analyzed on the basis of the derived surface layer thickness Ts. Note that, in the microstructure analyzer according to the present invention, it is possible to add not only further operations of the individual devices, but also other devices so as to execute the individual steps in any of the above-described microstructure analysis methods. For example, the microstructure analyzer may include an analysis device for analyzing the microstructure of the porous body on the basis of the surface layer thickness Ts.

BRIEF DESCRIPTION OF THE DRAWINGS

FIG. 6 is an explanatory view of the porous-body data 60.

DETAILED DESCRIPTION OF THE INVENTION

Figure 1:
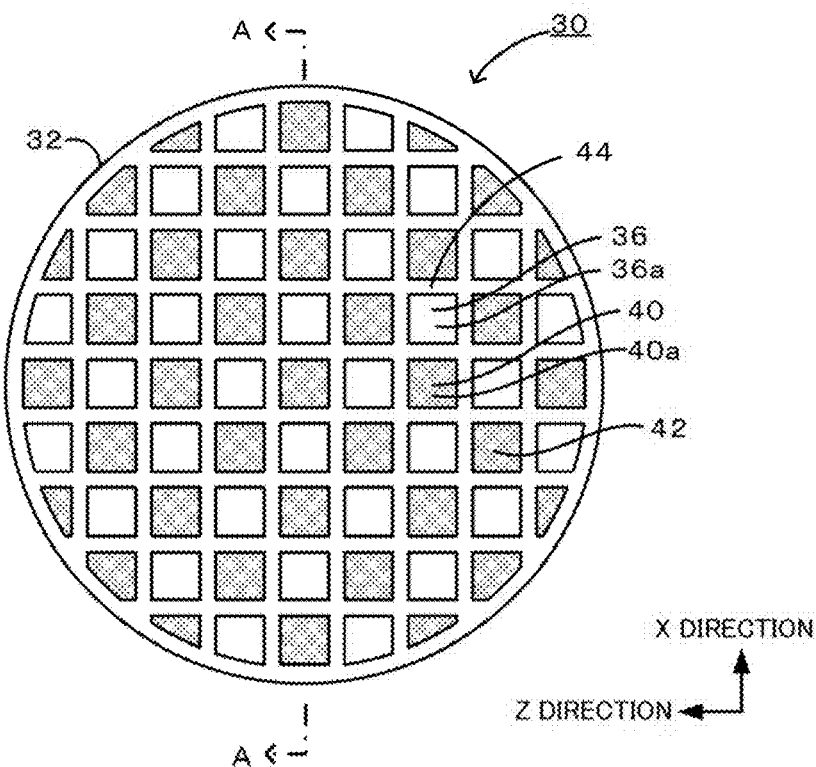
FIG. 1 is a front view of a honeycomb filter 30 including partitions 44.
Figure 2:
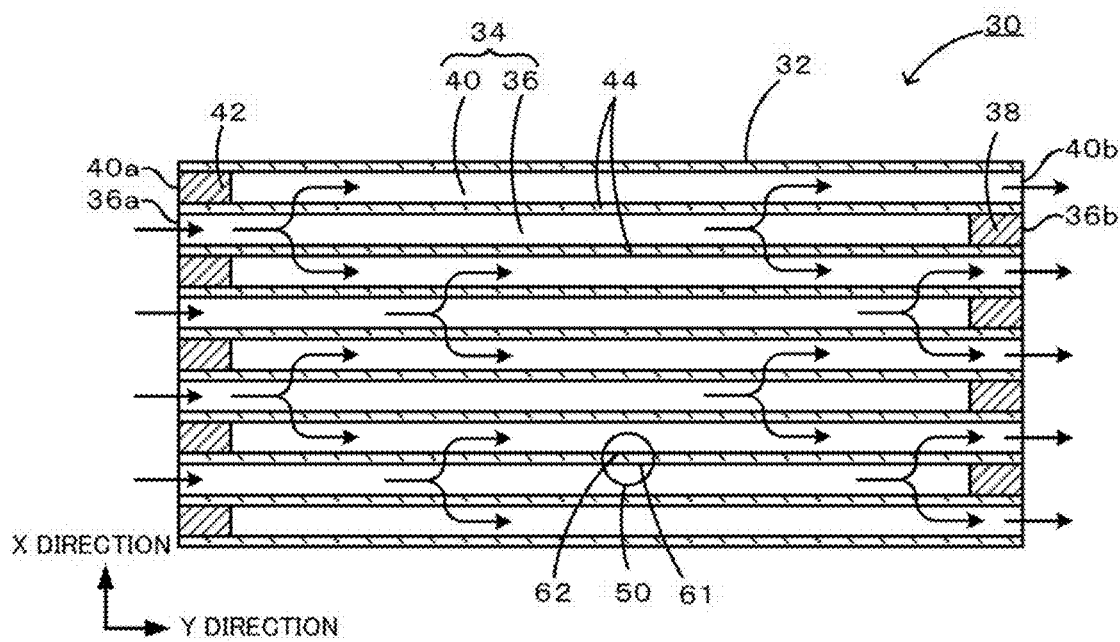
FIG. 2 is a sectional view taken along a line A-A in FIG. 1.

An embodiment of the present invention will be described below with reference to the drawings. FIG. 1 is a front view of a honeycomb filter 30 including partitions 44, the honeycomb filter 30 being one embodiment of a porous body according to the present invention, and FIG. 2 is a sectional view taken along a line A-A in FIG. 1.

The honeycomb filter 30 is a diesel particulate filter (DPF) with a function of filtering particulate matter (PM) in exhaust gas emitted from a diesel engine. The honeycomb filter 30 includes a large number of cells 34 (refer to FIG. 2) defined by the partitions 44 in a porous form, and an outer periphery protective portion 32 formed around the cells 34. The material for the partitions 44 is preferably a ceramic material made of inorganic particles of Si-Sic, cordierite, or the like from the viewpoint of strength and heat resistance. The partitions 44 preferably have a thickness T of 100 μm or more and less than 600 μm. In this embodiment, the thickness T is 300 μm. The partitions 44 have an average pore size (measured by mercury porosimetry) of 10 μm or more and less than 60 μm, for example, and a porosity P (void ratio) of 25% or more and less than 70%, for example. The definition of the porosity P (i.e., the method of measuring the porosity) will be described later. As illustrated in FIG. 2, the large number of cells 34 formed in the honeycomb filter 30 are divided into open-inlet cells 36 each having an open inlet 36a and an outlet 36b sealed with an outlet sealing material 38, and open-outlet cells 40 each having an inlet 40a sealed with an inlet sealing material 42 and an open outlet 40b. Those open-inlet cells 36 and open-outlet cells 40 are alternately disposed so as to be adjacent to one another. The density of the cells is, for example, 15 cells/cm² or more and less than 65 cells/cm². The outer periphery protective portion 32 is a layer for protecting the outer periphery of the honeycomb filter 30. The outer periphery protective portion 32 may contain, for example, the above-described inorganic particles, inorganic fibers of aluminosilicate, alumina, silica, zirconia, ceria, mullite, or the like, and a binder such as colloidal silica or clay.

The honeycomb filter 30 is placed, for example, downstream of a diesel engine (not illustrated) and is used to clean PM-containing exhaust gas and to release the clean exhaust gas into the air. Arrows in FIG. 2 indicate flows of the exhaust gas in that occasion. The PM-containing exhaust gas emitted from the diesel engine flows into the open-inlet cells 36 through the inlets 36a of the honeycomb filter 30, then flows into the adjacent open-outlet cells 40 after passing through the partitions 44, and is released into the air through the outlets 40b of the open-outlet cells 40. While the PM-containing exhaust gas flows into the open-outlet cells 40 from the open-inlet cells 36 through the partitions 44, PM is trapped; and hence the exhaust gas having flowed into the open-outlet cells 40 is a clean exhaust gas not containing PM.

In the partitions 44 according to this embodiment, the following formula (1) is satisfied for a surface layer thickness Ts [μm] and the porosity P [%] of the porous body, values of those parameters being derived when a later-described microstructure analysis method is carried out on the porous body constituting the partitions 44. More preferably, the following formula (2) is satisfied. The microstructure analysis method will be described below.

$$P \geq 0.54 \ Ts \quad (1)$$

$$P \geq 0.63 \ Ts \quad (2)$$

(where 0%<P<100% and 0 μm<Ts)

Figure 3:
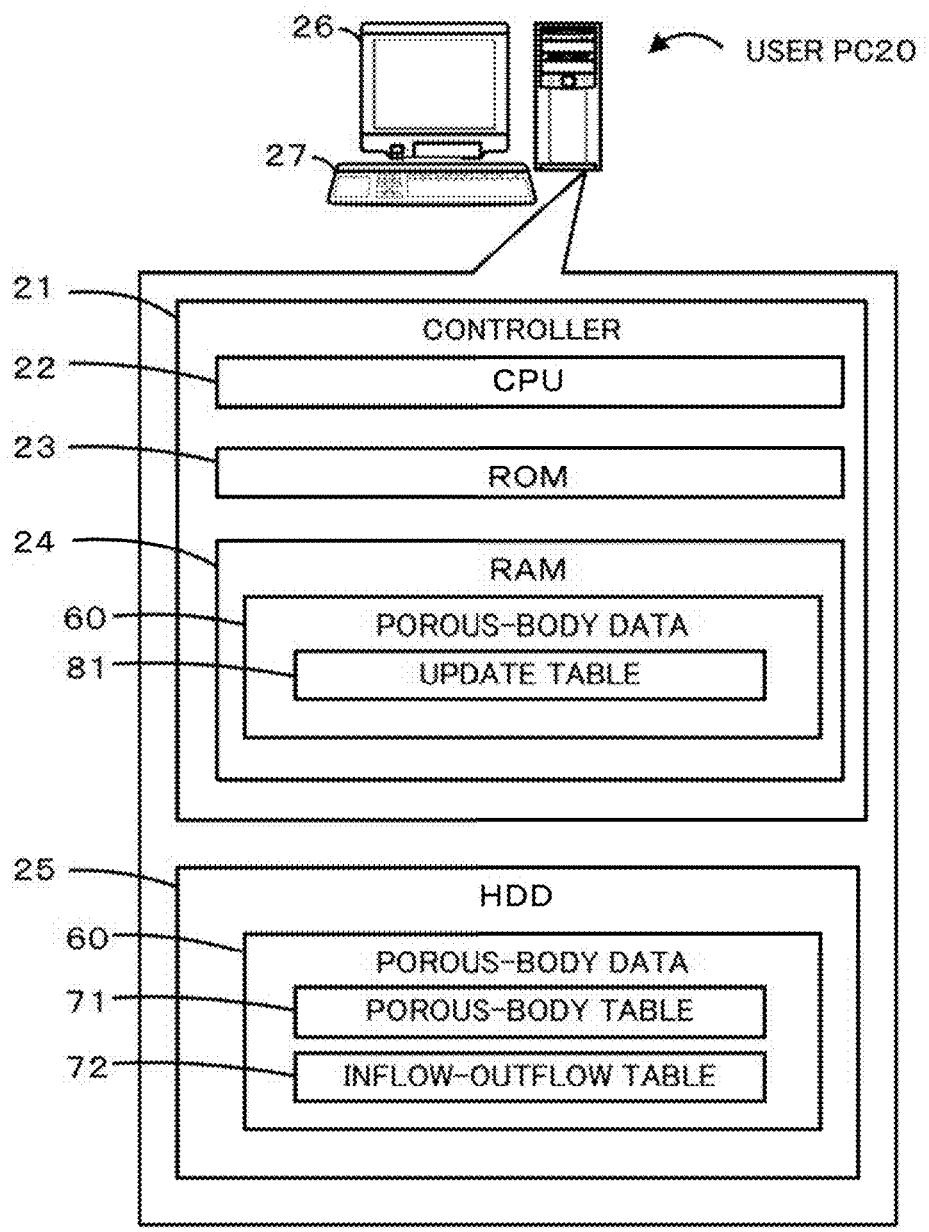
FIG. 3 schematically illustrates a configuration of a user personal computer 20.

FIG. 3 schematically illustrates a configuration of a user personal computer (PC) 20 that is constituted as a microstructure analyzer for analyzing the microstructure of the partitions 44. The user PC 20 is a practical example of the microstructure analyzer according to the present invention. The user PC 20 includes a controller 21 including a CPU 22 that executes various processes, a ROM 23 that stores various processing programs and the like, and a RAM 24 that temporarily stores data; and a HDD 25 that is a mass storage memory storing various processing programs such as analysis processing programs and various data such as porous-body data 60 that is three-dimensional pixel data of the porous body. The user PC 20 further includes a display 26 that displays various information on a screen, and an input device 27 with which the user inputs various commands, such as a keyboard. As will be described in detail below, the porous-body data 60 stored in the HDD 25 includes a porous body table 71 and an inflow-outflow table 72. The user PC 20 is capable of functioning to analyze the microstructure of the porous body on the basis of the porous-body data 60 stored in the HDD 25. During the process of performing the analysis of the microstructure, data similar to the porous-body data 60 is stored in the RAM 24. Note that the RAM 24 further stores update tables 81 and 82 which are updated versions of the porous-body data 60, those update tables being described later.

The HDD 25 of the user PC 20 stores, as the porous-body data 60, three-dimensional voxel data of the partitions 44 obtained by subjecting the honeycomb filter 30 to a CT scan. In this embodiment, an XY plane defined by the X direction and the Y direction illustrated in FIG. 2 is selected as an imaging section, and a plurality of such imaging sections are produced in the Z direction illustrated in FIG. 1. In this manner, the CT scan is performed to obtain voxel data. In this embodiment, the resolution in each of the X, Y, and Z directions is 1.2 μm, which provides a cube having 1.2 μm sides and serving as a voxel. The resolution in each of the X, Y, and Z directions can be appropriately set in accordance with, for example, the performance of a CT scanner or the size of particles to be analyzed. The resolutions in the directions may be different from each other. Although not particularly limited, the resolutions in the X, Y, and Z directions may be set to values within a range of, for example, 0.1 to 3.0 μm. The position of each voxel is identified by X, Y, and Z coordinates (a coordinate value of 1 corresponds to a length of a side of a voxel, 1.2 μm). The coordinates are associated with type information indicating whether the voxel represents a space (pore) or an object (material for the partitions 44) and stored in the HDD 25. In this embodiment, voxels representing spaces (spatial voxels) are tagged with a type-information value of 0, and voxels representing objects (object voxels) are tagged with a type-information value of 9. The data actually obtained by a CT scan is, for example, luminance data at individual X, Y, and Z coordinates. The porous-body data 60 used in this embodiment can be obtained by converting the luminance data into a binary representation with respect to a predetermined threshold so that voxels are determined for each of the coordinates as to whether each voxel is a spatial voxel or an object voxel. The predetermined threshold is set as a value that allows appropriate determination as to whether the voxels are spatial voxels or object voxels. For example, the threshold may be automatically determined from the luminance distribution of the luminance data (e.g., discriminant analysis method (Otsu's method)). Such a CT scan can be performed with, for example, SMX-160CT-SV3 manufactured by SHIMADZU CORPORATION.

Figure 4:
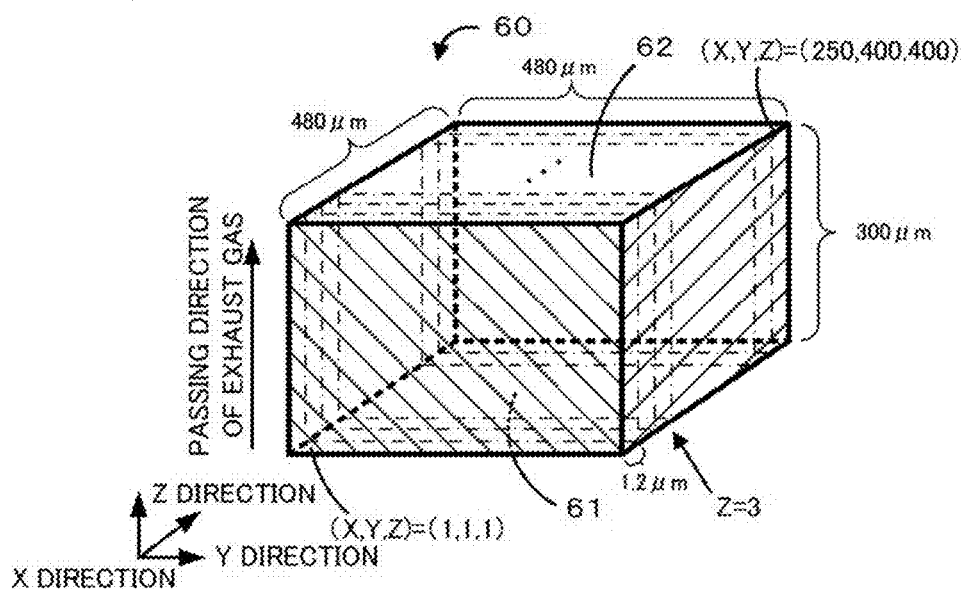
FIG. 4 is a conceptual view of porous-body data 60.
Figure 5:
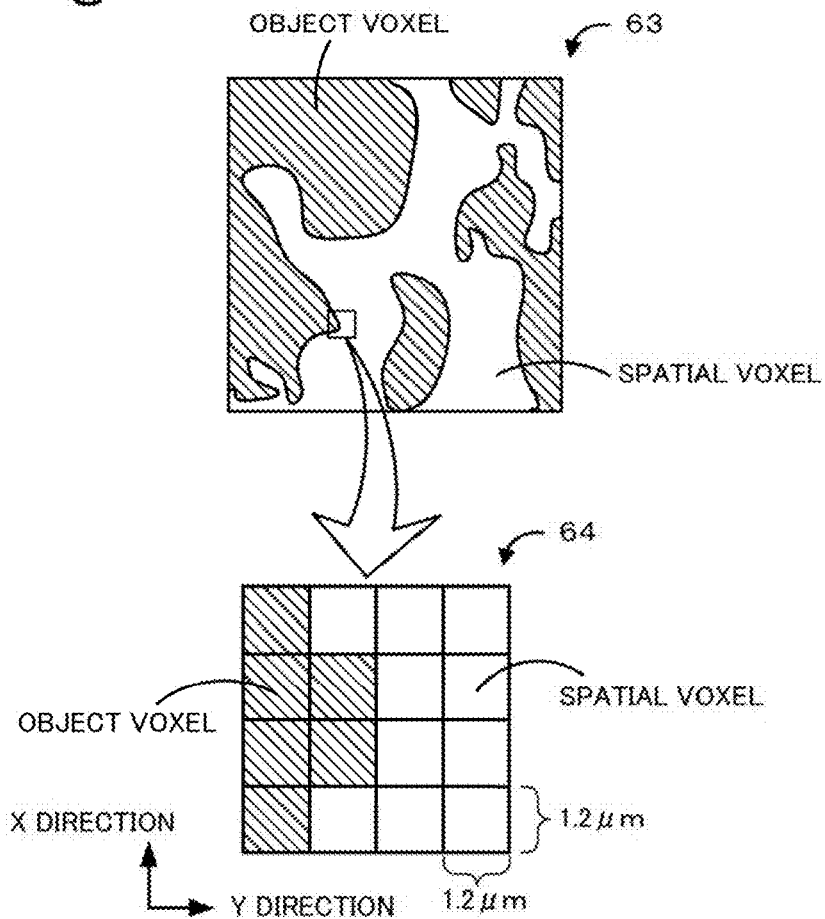
FIG. 5 is an explanatory view of an imaging section 63 of the partition 44.

FIG. 4 illustrates a conceptual view of the porous-body data 60. FIG. 4 is a conceptual view of the porous-body data 60 that is obtained as voxel data by subjecting the partition 44 in a region 50 in FIG. 2 to a CT scan. The porous-body data 60 in this embodiment is extracted from the voxel data of the partition 44. Specifically, the porous-body data 60 is voxel data of a rectangular parallelepiped portion having a length of 300 μm (=1.2 μm×250 voxels) in the X direction, which is the same as the thickness of the partition 44 in the passing direction of the exhaust gas (i.e., the thickness T), having a length of 480 μm (=1.2 μm×400 voxels) in the Y direction, and having a length of 480 μm (=1.2 μm×400 voxels) in the Z direction. The porous-body data 60 is subjected to the analysis processing described later. Note that the dimensions of the porous-body data 60 can be appropriately set in accordance with, for example, the thickness T and the size of the partition 44 or an acceptable calculation load. For example, the length in the X direction is not limited to 300 μm and may be another value that is the same as the thickness of the partition 44 in the passing direction of the exhaust gas (i.e., the thickness T). The length in the X direction is preferably the same value as the thickness of the partition 44 in the passing direction of exhaust gas (i.e., the thickness T), but the length and the thickness may be different values. The lengths in the Y and Z directions are also not limited to 480 μm and may be other values. The lengths in the Y and Z directions may be different from each other. Among six planes of the rectangular parallelepiped of the porous-body data 60, two planes (planes parallel to the YZ plane) are an inflow plane 61 (refer to FIG. 2) that is a boundary plane between the partition 44 and the open-inlet cell 36, and an outflow plane 62 (refer to FIG. 2) that is a boundary plane between the partition 44 and the open-outlet cell 40, whereas the other four planes are sections of the partition 44. FIG. 5 illustrates an XY plane (imaging section) 63 at a position where the Z coordinate value is 3 in the porous-body data 60, and an enlarged view 64 of a portion of the XY plane 63. As illustrated in the enlarged view 64, the XY plane 63 is made up of an array of voxels having 1.2 μm sides. Each voxel is represented by a spatial voxel or an object voxel. Note that the imaging section obtained by a CT scan is given as data of a plane having no thickness in the Z direction as illustrated in FIG. 5. However, each imaging section is handled as having a thickness of an interval (1.2 μm) between adjacent imaging sections in the Z direction. In other words, each voxel is handled as a cube having 1.2 μm sides as described above. Note that, as illustrated in FIG. 6, the porous-body data 60 is stored in the HDD 25 as data including the porous-body table 71 in which the XYZ coordinates serving as positional information of each voxel are associated with type information, and the inflow-outflow table 72 indicating the inflow plane 61 and the outflow plane 62. In FIG. 6, "X=1" in the inflow-outflow table 72 denotes a plane at X=1 of the XYZ coordinate system, i.e., the inflow plane 61 illustrated in FIG. 4. Similarly, "X=251" denotes the outflow plane 62. The HDD 25 stores, in addition to the porous-body data 60, multiple pieces of other porous-body data representing voxel data of the partitions 44 in regions other than the above-mentioned region 50.

As described above, the porous-body data 60 is voxel data of the partition 44 obtained by subjecting the honeycomb filter 30 to a CT scan. When the CT scan is performed, the inflow plane 61 is arranged so as to be parallel to one of the XY plane, the XZ plane, and the YZ plane as much as possible. In this embodiment, the inflow plane 61 is arranged so as to be parallel to the YZ plane as much as possible. Furthermore, it is assumed that the porous-body data 60 is obtained by performing the CT scan on a region of the partition 44, the region including at least the inflow plane 61 (i.e., the boundary plane between the partition 44 and the open-inlet cell 36; namely, an inner peripheral surface of the partition 44).

Figure 7:
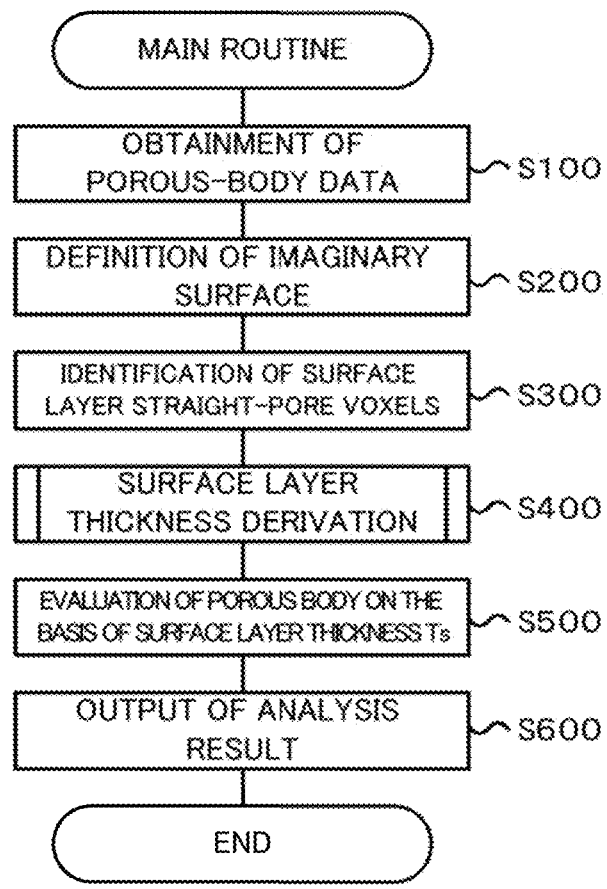
FIG. 7 is a flowchart illustrating an example of a main routine of analysis processing.

The analysis processing executed by the user PC 20 to perform the microstructure analysis method with respect to the porous-body data 60 will be described below. FIG. 7 is a flowchart illustrating an example of a main routine of the analysis processing. This main routine is carried out by the CPU 22 executing the analysis processing programs stored in the HDD 25 when the user inputs, via the input device 27, a command of staring the analysis processing. The following description is made in connection with the case where the analysis processing of the porous-body data 60 is performed. However, analysis processing of other porous-body data can also be performed in a similar manner. Which one of plural sets of porous-body data is to be analyzed may be determined in advance or may be designated by the user.

Upon start of the main routine, first, the CPU 22 obtains the porous-body data 60 (Step S100). Specifically, the CPU 22 reads the porous-body data 60 stored in the HDD 25 and stores it in the RAM 24. Thus, the same data as the porous-body data 60 stored in the HDD 25 and including the porous-body table 71 and the inflow-outflow table 72 is stored in the RAM 24.

Figure 8:
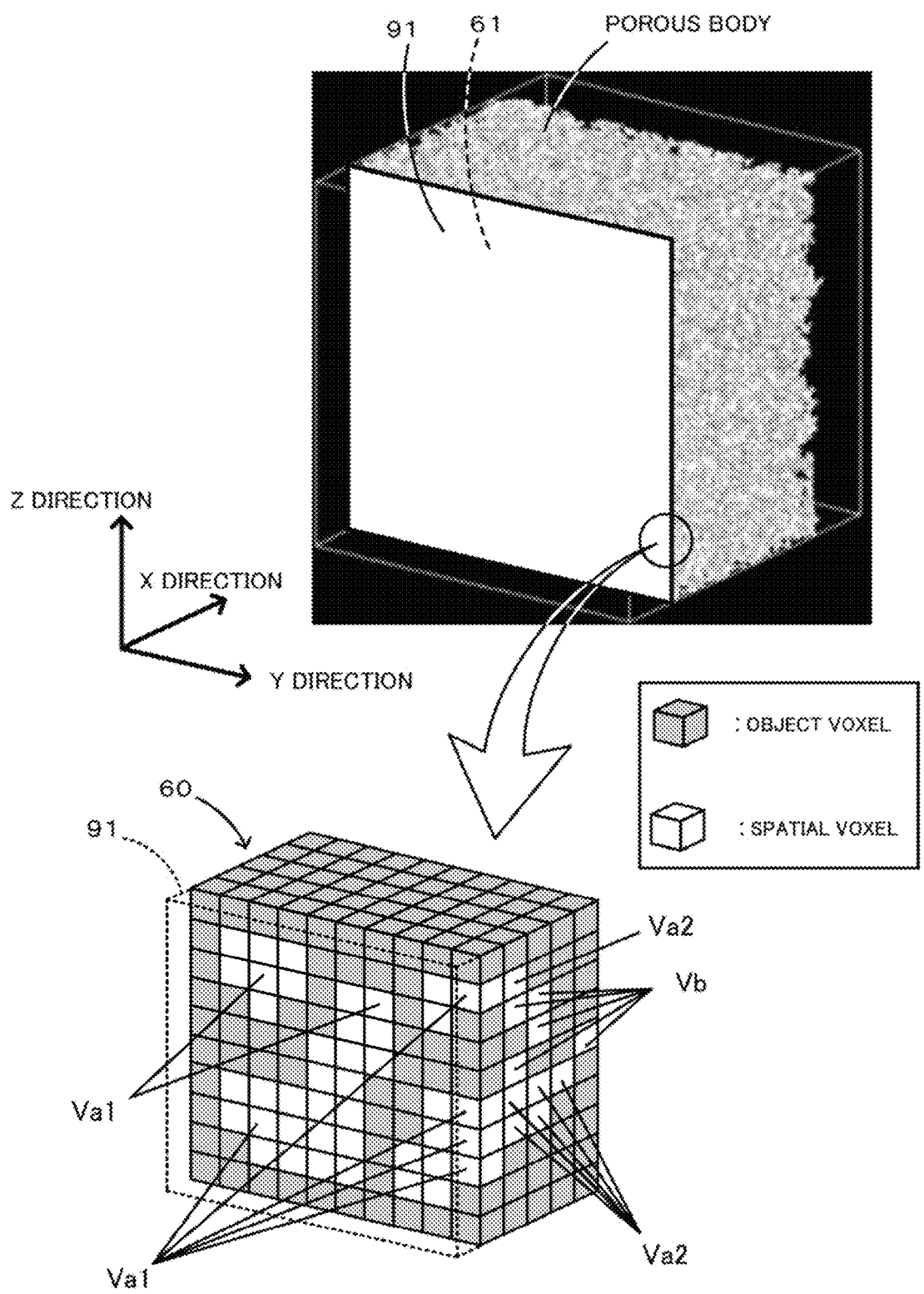
FIG. 8 is an explanatory view of an imaginary surface 91 and surface layer straight-pore voxels Va1 and Va2.

Then, the CPU 22 defines an imaginary surface on the surface side of the porous body (Step S200, corresponding to a step (a) in the present invention). Specifically, the CPU 22 defines an imaginary surface 91 in part of the surface of the porous body on the inflow plane 61 side. As illustrated in FIG. 8, the CPU 22 defines the imaginary surface 91 on the inflow plane 61 side such that the imaginary surface 91 is in contact with at least one protruding object voxel present on the inflow plane 61 including irregularities of the porous body. The imaginary surface 91 is a plane parallel to the YZ plane, which is most parallel to the inflow plane 61 of the porous body among the XY plane, the XZ plane, and the YZ plane in the three-dimensional coordinates. Since the imaginary surface 91 is constituted by three-dimensional voxels, the imaginary surface 91 is actually not a plane, but it is a flat plate (having a three-dimensional shape). Herein, the phrase "the imaginary surface 91 is in contact with the object voxels" means that voxels constituting the imaginary surface 91 are in surface contact with object voxels.

Figure 9:
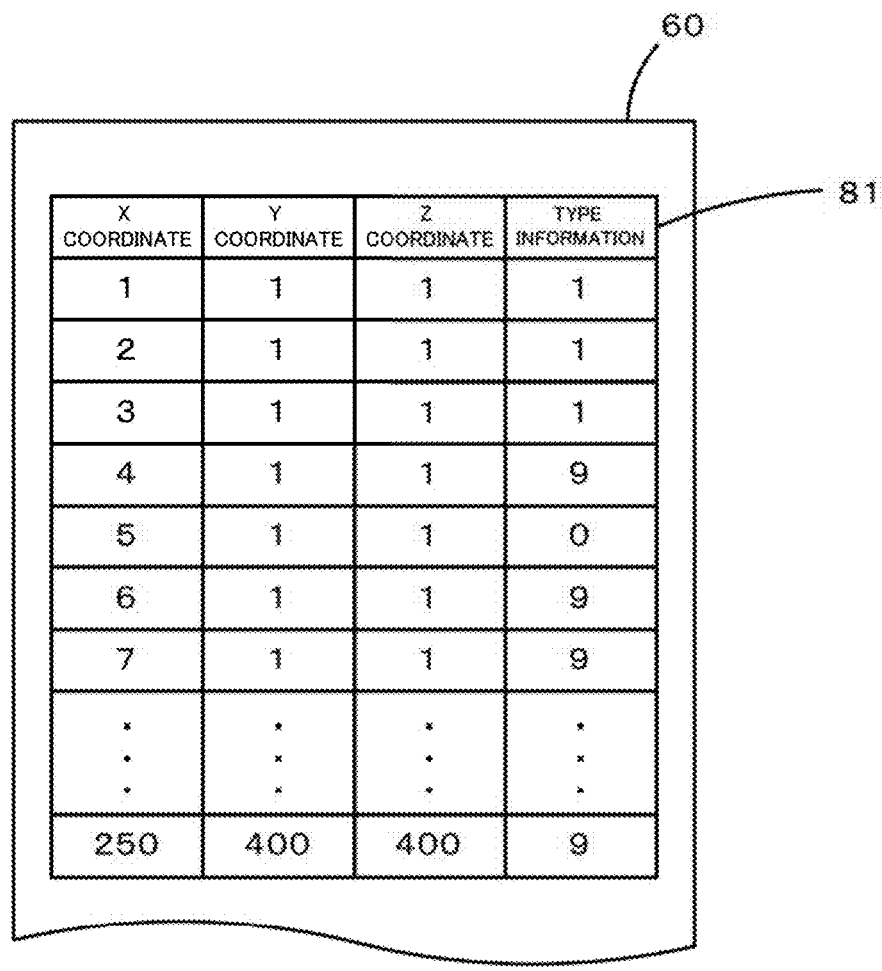
FIG. 9 is an explanatory view of an update table 81.

Then, the CPU 22 identifies the surface layer straight-pore voxels on the basis of the imaginary surface 91 (Step S300, corresponding to a step (b) in the present invention). First, the CPU 22 identifies, as the surface layer straight-pore voxels, all spatial voxels (spatial voxels in contact with the imaginary surface 91) having an X coordinate value larger than the X coordinate value of the imaginary surface 91 by one, and updates the type information of those spatial voxels from a value of 0 to a value of 1. The type-information value of 1 indicates the surface layer straight-pore voxel. Subsequently, the CPU 22 selects one from the surface layer straight-pore voxels that are in contact with the imaginary surface 91, and identifies, as the surface layer straight-pore voxels, spatial voxels that continuously lie from the selected surface layer straight-pore voxel toward the inside of the porous body in a thickness direction, which is perpendicular to the imaginary surface 91 and which extends toward the inside of the porous body. The CPU 20 updates the type information of those spatial voxels from a value of 0 to a value of 1. The above-mentioned operation is performed on all the surface layer straight-pore voxels that are in contact with the imaginary surface 91. Note that, in this embodiment, since the imaginary surface 91 is a plane parallel to the YZ plane, the X direction is the thickness direction. In a partially enlarged view in FIG. 8, for example, all spatial voxels that are in contact with the imaginary surface 91 are identified as surface layer straight-pore voxels Va1. Furthermore, spatial voxels that continuously lie straight from each of the surface layer straight-pore voxels Va1 toward the inside of the porous body in the thickness direction (X direction) are identified as surface layer straight-pore voxels Va2. Other spatial voxels are identified as non-surface layer straight-pore voxels Vb. The type information of the spatial voxels identified as the surface layer straight-pore voxels Va1 and Va2 is updated from a value of 0 to a value of 1. The type information of the spatial voxels identified as the non-surface layer straight-pore voxels Vb remains as a value of 0. After the completion of the operation of Step S300, the porous-body table 71 is updated to an update table 81 illustrated in FIG. 9, which is based on the imaginary surface 91 on the inflow plane 61 side.

Figure 10:
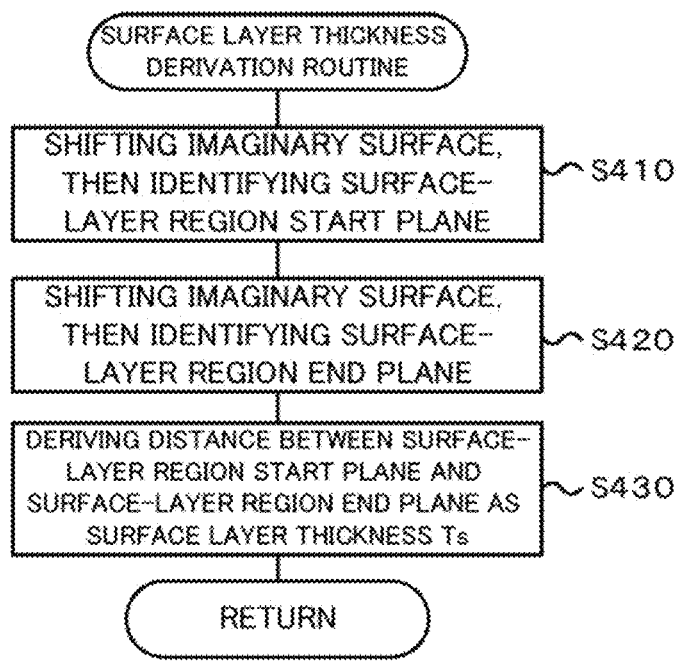
FIG. 10 is a flowchart illustrating an example of a surface layer thickness derivation routine.
Figure 11:
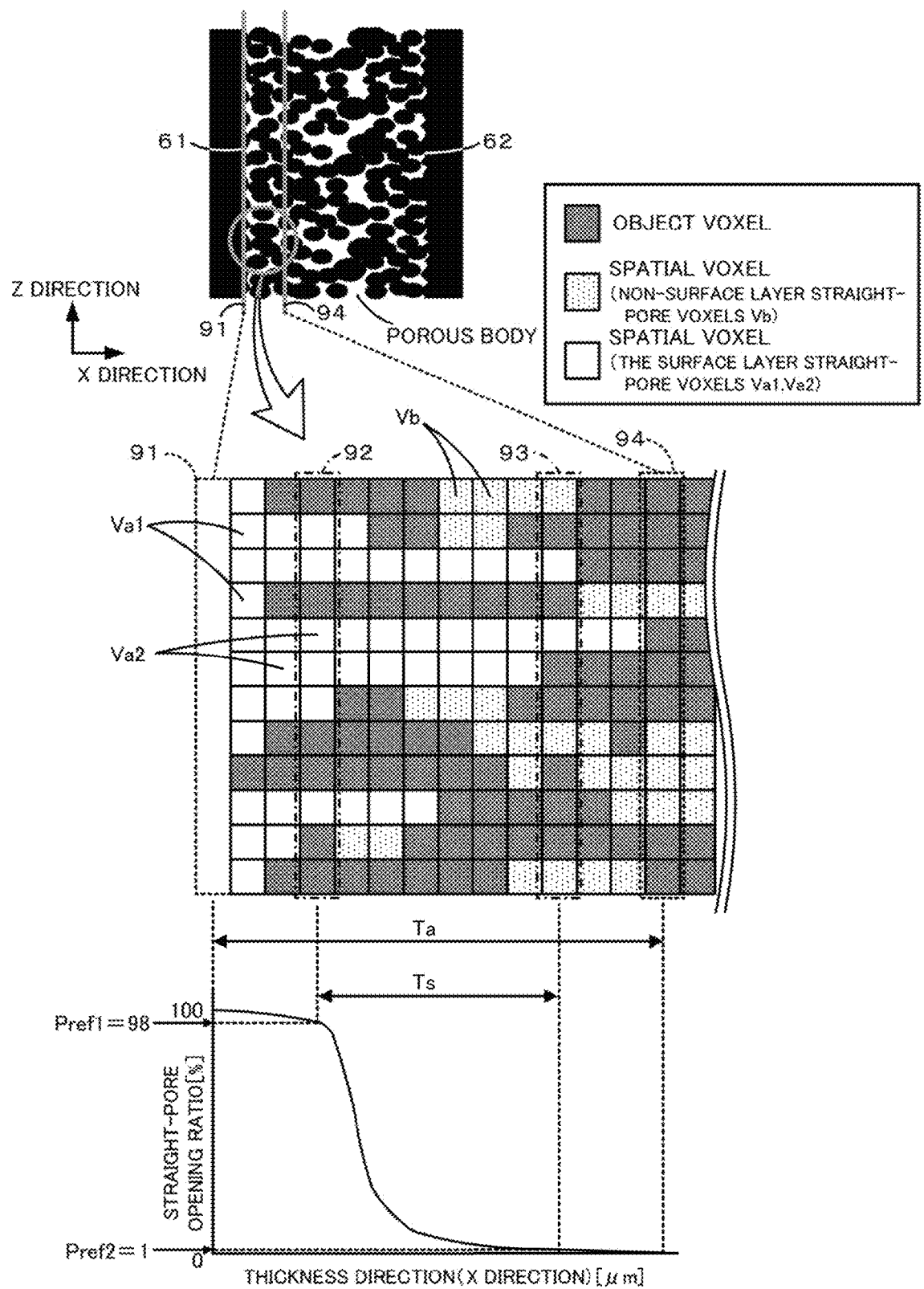
FIG. 11 is an explanatory view illustrating a manner of deriving a surface layer thickness Ts.

Then, the CPU 22 executes a surface layer thickness derivation routine (Step S400, corresponding to a step (c) in the present invention). FIG. 10 is a flowchart illustrating an example of the surface layer thickness derivation routine. FIG. 11 is an explanatory view illustrating a manner of deriving the surface layer thickness Ts. An upper column in FIG. 11 provides an explanatory view representing the imaginary surface 91 and an imaginary inner surface 94 of the porous body, a middle column provides a partially enlarged view of a region between the imaginary surface 91 and the imaginary inner surface 94, and a lower column provides a graph plotting a relationship between a position from the imaginary surface 91 in the thickness direction and a straight-pore opening ratio.

Upon start of this routine, first, the CPU 22 successively shifts the imaginary surface 91 in the thickness direction to define the imaginary surface after each shift as an imaginary reference plane, and identifies, as a surface-layer region start plane 92, an imaginary reference plane in which a straight-pore opening ratio in the imaginary reference plane takes a first opening ratio Pref1 (Step S410). The straight-pore opening ratio stands for a proportion of the surface layer straight-pore voxels occupying the imaginary reference surface. More specifically, the straight-pore opening ratio= (number of the surface layer straight-pore voxels occupying the imaginary reference surface)/(number of all the voxels occupying the imaginary reference surface)×100%. Note that the phrase "all the voxels" represents the object voxels and the spatial voxels (=the surface layer straight-pore voxels and the non-surface layer straight-pore voxels). The first opening ratio Pref1 is assumed to be 98% in this embodiment. Here, a region where the surface layer straight-pore voxels are present in the porous body is first described. In this embodiment, as illustrated in the middle column in FIG. 11, since no object voxels are present in the imaginary surface 91, the straight-pore opening ratio can be assumed to be 100% in the imaginary surface 91. As plotted in the lower column in FIG. 11, when the imaginary surface 91 is successively shifted in the thickness direction (X direction), a value of the straight-pore opening ratio in the imaginary reference plane, which is given by the imaginary surface after each shift, reduces as the imaginary surface 91 is shifted toward the inside of the porous body (rightward in FIG. 11). In FIG. 11, the imaginary reference plane in which the straight-pore opening ratio becomes 0% for the first time with the successive shift of the imaginary surface 91 is indicated as the imaginary inner surface 94. In other words, the imaginary inner surface 94 is a plane passing a voxel adjacent to the surface layer straight-pore voxel in the thickness direction, which is positioned on the most inner side (deepest side) of the porous body in the thickness direction. A region between the imaginary surface 91 and the imaginary inner surface 94 is a region where the surface layer straight-pore voxels are present. In Step S410, the CPU 22 repeats the process of shifting the imaginary surface 91 in the thickness direction by one voxel and deriving the straight-pore opening ratio in the imaginary reference plane after the shift, and identifies, as the surface-layer region start plane 92, the imaginary reference plane in which the straight-pore opening ratio after the shift takes the first opening ratio Pref1 (refer to the middle column and the lower column in FIG. 11). Note that, in this embodiment, the imaginary reference plane in which the straight-pore opening ratio after the shift becomes the first opening ratio Pref1 (=98%) or below for the first time is identified as the surface-layer region start plane 92. The surface-layer region start plane 92 identified as described above is positioned on the inner side of the porous body than the imaginary surface 91 in the thickness direction.

Subsequently, the CPU 22 continues to successively shift the imaginary surface 91 in the thickness direction and identifies, as a surface-layer region end plane 93, an imaginary reference plane in which the straight-pore opening ratio after the shift takes a second opening ratio Pref2 (Step S420). This process is performed in a similar manner to that in step S410 except that the second opening ratio Pref2 is used as a threshold instead of the first opening ratio Pref1. In other words, the CPU 22 identifies, as the surface-layer region end plane 93, the imaginary reference plane in which the straight-pore opening ratio after the shift becomes the second opening ratio Pref2 or below for the first time. The second opening ratio Pref2 is assumed to be 1% in this embodiment. The surface-layer region end plane 93 identified as described above is positioned on the side closer to the surface of the porous body (closer to the imaginary surface 91) than the imaginary inner surface 94 in the thickness direction. Since the surface-layer region end plane 93 is positioned on the inner side of the porous body than the surface-layer region start plane 92 in the thickness direction, the CPU 22 may start the operation of shifting the imaginary surface 91 in Step S420 from the position of the surface-layer region start plane 92.

Then, the CPU 22 derives, as the surface layer thickness Ts [μm], a distance between the identified surface-layer region start plane 92 and the identified surface-layer region end plane 93 in the thickness direction (Step S430), and returns to the main routine after ending the above routine. Each of the surface-layer region start plane 92 and the surface-layer region end plane 93 is actually not a plane, but it is a flat plate (having a three-dimensional shape) like the imaginary surface 91. In the process of deriving the surface layer thickness Ts, however, the CPU 22 derives the surface layer thickness Ts on an assumption that the surface-layer region start plane 92 and the surface-layer region end plane 93 are planes. Stated in another way, in this embodiment, a difference between the X coordinate of the surface-layer region start plane 92 and the X coordinate of the surface-layer region end plane 93 is derived as the surface layer thickness Ts. Thus, in this embodiment, the surface layer thickness Ts is derived on an assumption that, instead of regarding, as a surface layer region, an entire region where the surface layer straight-pore voxels are present, part of the entire region is regarded as the surface layer region, the part being obtained by excluding, from the entire region, a zone on the side closer to the imaginary surface 91 than the surface-layer region start plane 92 and a zone on the side closer to the imaginary inner surface 94 than the surface-layer region end plane 93.

Then, the CPU 22 evaluates a trapping capability of the porous body and a pressure loss after PM deposition on the basis of the derived surface layer thickness Ts (Step S500). Specifically, when the derived surface layer thickness Ts and the porosity P of the porous body satisfy P≥0.54 Ts (above formula (1)), the CPU 22 determines that the porous body (i.e., the region 50 of the partition 44) from which the porous-body data 60 has been obtained is "good" (namely, that the trapping capability of the porous body is high and the pressure loss after the PM deposition is low). When P≥0.63 Ts (above formula (2)) is satisfied, the CPU 22 determines that the porous body is "even better". In the other case (where P<0.54 Ts is satisfied), the CPU 22 determines that the porous body is "no-good". It is here assumed that the porosity P is given as a value based on a zone of the region between the inflow plane 61 and the outflow plane 62 (i.e., a zone corresponding to ⅘ of the thickness T) except for a zone corresponding to ⅒ of the thickness T from the inflow plane 61 side and a zone corresponding to ⅒ of the thickness T from the outflow plane 62 side. In this embodiment, the thickness T is 300 μm, for example. Therefore, on the basis of the voxels among the porous-body data 60 falling within a zone corresponding to a thickness of 200 μm except for a zone corresponding to a thickness of 50 μm (=300 μm×⅙) from the inflow plane 61 side and a zone corresponding to a thickness of 50 μm (=300 μm×⅙) from the outflow plane 62 side, the porosity P=(number of the spatial voxels among the porous-body data 60 in the zone corresponding to the thickness of 200 μm)/(number of all the voxels among the porous-body data 60 in the zone corresponding to the thickness of 200 μm)×100% is derived. The reason why the porosity P is derived on the basis of the zone excluding both the zones of the partition 44 near the inflow plane 61 and the outflow plane 62 is as follows. In some cases, the spatial voxels near the inflow plane 61 and near the outflow plane 62 include not only spatial voxels representing the pores inside the partition 44, but also spatial voxels representing spaces (not the pores) outside the partition 44 due to irregularities in the surface of the partition 44. Thus, the porosity P is to be derived on the basis of the spatial voxels excluding those ones not representing the pores. In this embodiment, as described above, the length of the porous-body data 60 in the X direction is set to the same value (300 μm) as the thickness of the partition 44 in the passing direction of the exhaust gas (i.e., the thickness T), and it covers the entire region from the inflow plane 61 to the outflow plane 62. When the porous-body data 60 contains data corresponding to the zone excluding the vicinity of the inflow plane 61 and the vicinity of the outflow plane 62 (i.e., the zone corresponding to ⅘ of the thickness T), the porosity P is derived on the basis of the porous-body data 60 as described above. On the other hand, when the length of the porous-body data 60 in the X direction is shorter than the thickness of the partition 44 in the passing direction of the exhaust gas (i.e., the thickness T) and the porous-body data 60 does not contain the data corresponding to the zone excluding the vicinity of the inflow plane 61 and the vicinity of the outflow plane 62 (i.e., the zone corresponding to ⅘ of the thickness T), the porosity P is derived by separately preparing voxel data that contains the data corresponding to the relevant zone. Part of the separately prepared voxel data may be the porous-body data 60. A value of the porosity P may be derived by the CPU 22 in Step S500, for example, during the analysis processing, or may be previously included in the porous-body data 60. Furthermore, in step S500, the CPU 22 stores the surface layer thickness Ts, the value of the porosity P, the result of the good/no-good determination, and so on in the RAM 24.

Then, the CPU 22 executes an analysis result outputting process to output, as analysis result data, the information, etc., stored in the RAM 24 in the above-described processing of Steps S100 to S500, and to store the analysis result data in the HDD 25 (Step S600). The main routine is thus ended. The analysis result data contains, for example, not only the porous-body data 60 including the update table 81 stored in the RAM 24, but also the surface layer thickness Ts, the value of the porosity P, and the good/no-good result, which have been derived in Step S500.

In the analysis results obtained by analyzing the microstructure, as described above, for the partitions 44 according to this embodiment, the surface layer thickness Ts [μm] and the porosity P [%] of the porous body satisfy the formula (1)

(namely, the determination result is "good" or "even better"). More preferably, the formula (2) is satisfied (namely, the determination result is "even better").

The surface layer thickness Ts may be, for example, more than 0 μm and 150 μm or less. Alternatively, the surface layer thickness Ts may be 5 μm or more and 100 μm or less. The surface layer thickness Ts takes a value smaller than the thickness of the partition 44 in the passing direction of the exhaust gas (i.e., the thickness T). In other words, a ratio Ts/T of the surface layer thickness Ts to the thickness T is more than 0 and less than 1. The ratio Ts/T may take a value of 0.5 or less, or 0.3 or less. The ratio Ts/T may take a value of 0.1 or more. A difference (T−Ts) between the thickness T and the surface layer thickness Ts may be 100 μm or more or 200 μm or more. The difference (T−Ts) may be 300 μm or less.

A method of manufacturing the honeycomb filter 30 including the partitions 44, according to this embodiment, will be described below. The manufacturing method for the partitions 44 of the honeycomb filter 30 includes, for example, a raw material mixing step of mixing a base material and a pore-forming material to prepare clay, a forming step of forming the clay into a compact, and a firing step of firing the compact.

The base material used in the raw material mixing step may be the above-described inorganic particles. For example, when the base material is formed of SiC, a mixture prepared by mixing SiC powder and metal Si powder at a mass ratio of 80:20 may be used. When cordierite is used as the material of the partitions 44, a cordierite-like raw material may be used as the base material. The cordierite-like raw material may be, for example, a material containing at least two or more inorganic raw materials selected from a group consisting of talc, kaolin, fired kaolin, alumina, aluminum hydroxide, and silica at a proportion providing a chemical composition similar to that of cordierite. The pore-forming material is preferably burnt off by firing that is performed later, and may be, for example, starch, coke, or resin foam. An average particle size of the base material is not limited to a particular value, but it is 5 to 50 μm, for example. An average particle size of the pore-forming material is not limited to a particular value, but it is 5 to 50 μm, for example. In the raw material mixing step, a binder such as methylcellulose or hydroxypropoxyl methylcellulose, water, etc. may be added. A dispersant may be further mixed. The dispersant may be a surfactant such as ethylene glycol. The step for preparing the clay is not particularly limited, and the clay may be prepared by, e.g., a method that uses a kneader, a vacuum clay kneader, or the like. In the raw material mixing step, surface layer clay used for forming a surface layer portion that includes the surface layer region of the partition 44, and non-surface layer clay used for forming a non-surface layer portion other than the surface layer portion of the partition 44 are prepared separately. The surface layer portion including the surface layer region indicates a portion of the partition 44 on the side closer to the imaginary surface 91 (i.e., the inflow plane 61) than the imaginary inner surface 94 in FIG. 11, or a portion of the partition 44 on the side closer to the imaginary surface 91 (i.e., the inflow plane 61) than the surface-layer region end plane 93 in FIG. 11. The non-surface layer clay may be, for example, clay made of known materials used in manufacturing partitions of honeycomb filters and mixed at a known mixing ratio. The surface layer clay is given as clay prepared such that the partitions 44 after the firing satisfy the formula (1). The surface layer clay may be different in at least one of the materials, the particle size, and the mixing ratio in comparison with the non-surface layer clay.

In the forming step, a compact having the same shape as the partitions 44 is formed using the surface layer clay and the non-surface layer clay. For example, the non-surface layer clay is first extruded using a die having a shape corresponding to the arrangement of the cells 34 so as to have the shape of the partitions 44 illustrated in FIGS. 1 and 2. The die used at that time is given as a die providing a compact corresponding to the non-surface portions of the partitions 44, e.g., a compact having a shape thinner than the thickness T of the partitions 44. Subsequently, after drying the compact corresponding to the non-surface layer portions, spaces corresponding to the cells 34 are sealed with the outlet sealing material 38 and the inlet sealing material 42. The outlet sealing material 38 and the inlet sealing material 42 may be each the raw material used to form the partitions 44 (e.g., the non-surface layer clay). Then, the compact after the sealing is dipped in the surface layer clay to coat a portion of surfaces of the compact with the surface layer clay, the portion corresponding to inner peripheral surfaces of the open-inlet cells 36. Thereafter, the compact is dried. As a result, a compact is obtained in which a portion corresponding to the non-surface layer portions of the partitions 44 is formed of the non-surface layer clay and a portion corresponding to the surface layer portions of the partitions 44 is formed of the surface layer clay.

In the firing step, the compact is subjected to a calcination treatment and a firing treatment. The calcination treatment is performed at a temperature lower than a firing temperature to burn off organic components contained in the compact. The firing temperature is, for example, 1450° C. when Si—SiC is used, and is, for example, 1400° C. to 1450° C. when cordierite is used as the raw material. After the firing step, an outer periphery of the fired compact is cut, and a protective material is coated over the outer periphery of the cut compact to form the outer periphery protective portion 32. The honeycomb filter 30 having a circular cylindrical external shape, illustrated in FIGS. 1 and 2, is obtained. Through the steps described above, the honeycomb filter 30 including the partitions 44, which satisfy the formula (1), can be obtained.

While, in the above-described manufacturing method, the compact is manufactured using the surface layer clay and the non-surface layer clay, the non-surface layer clay is not always needed to be used. In other words, the partitions 44 may be entirely manufactured using the surface layer clay.

The correspondence relationship of components between the embodiment and the microstructure analyzer of the present invention is now explained. The user PC 20 in the embodiment corresponds to the microstructure analyzer of the present invention. The RAM 24 and the HDD 25 correspond to a storage device. The CPU 22 corresponds to an imaginary surface definition device, an identification device, a surface layer thickness derivation device, and an analysis device. Note that, in the embodiment, the description of the operations of the user PC 20 also serve to explain an example of the microstructure analysis method of the present invention.

According to the embodiment described above in detail, the surface layer thickness Ts is derived with the above-described microstructure analysis for each of the partitions 44 constituting the porous body by employing the porous-body data 60, which is prepared through three-dimensional scanning of the region 50 including the surface (inflow plane 61) of the partition 44, and the derived surface layer thickness Ts takes a relatively small value satisfying the formula (1). This provides the partitions 44 in which the trapping capability is increased and the pressure loss after the PM deposition is reduced.

Here, the surface layer thickness Ts corresponds to a length of a surface layer region in the thickness direction, which region is determined in a manner of identifying, as the surface layer straight-pore voxels, the spatial voxels indicating a straight-pore portion, i.e., a portion of pores in the porous body, the portion linearly extending from an opening at the surface (inflow plane 61) of the porous body in the thickness direction, and then determining the surface layer region on the basis of a region where the identified surface layer straight-pore voxels are present. Thus, there is a tendency that a value of the surface layer thickness Ts increases in the porous body in which the straight pores extend up to inner deeper positions from the surface openings. Furthermore, as the value of the surface layer thickness Ts increases, the trapping capability tends to reduce and the pressure loss after the PM deposition tends to increase. The reason is presumably as follows. First, in a porous body having a larger value of the surface layer thickness Ts, i.e., a porous body in which the straight pores extend up to inner deeper positions from the surface openings, when a fluid flows into the porous body from its surface, PM in the fluid is not so trapped near the surface of the porous body, and tends to enter until the inner deeper positions of the porous body. It is hence thought that, in the porous body having a larger value of the surface layer thickness Ts, PM tends to penetrate through the porous body without being trapped, and the trapping capability tends to reduce. Moreover, with the lapse of time from the start of inflow of the fluid, PM is gradually deposited inside the porous body. On that occasion, because PM relatively easily penetrates through the surface layer region as described above, PM tends to first deposit near a boundary between the surface layer region and a region downstream of the surface layer region. With the further lapse of time thereafter, there is a tendency that a region where PM is deposited increases toward the surface side of the surface layer region from the vicinity of the above-mentioned boundary. Consequently, the PM deposition mostly occurs in the surface layer region of the porous body, and a total amount of deposited PM tends to increase in the porous body having a larger value of the surface layer thickness Ts. It is hence thought that the pressure loss after the PM deposition tends to increase in the porous body having a larger value of the surface layer thickness Ts. Thus, it is thought that the trapping capability can be increased and the pressure loss after the PM deposition can be reduced by setting the surface layer thickness Ts of the porous body to a relatively small value satisfying the formula (1) as described above. As seen from the formula (1), an upper limit value of the appropriate surface layer thickness Ts increases as the porosity P of the porous body increases. This is presumably attributable to the fact that, even when PM is deposited in the surface layer region, an influence upon an increase of the pressure loss is smaller when the porosity P of the porous body has a higher value.

Furthermore, in the partitions 44 in which the surface layer thickness Ts takes a value as small as satisfying the formula (2), the trapping capability is further increased and the pressure loss after the PM deposition is further reduced. When the porosity P is 25% or more, the porous body having such a value of the porosity P is relatively easy to manufacture. When the porosity P is 70% or less, the strength of the porous body can be increased sufficiently. In addition, the honeycomb filter 30 includes the partitions 44 each made of the porous body and forming the plurality of cells 34 that serve as fluid paths, and the surface of the porous body (i.e., the region 50 used to derive the surface layer thickness Ts) constitutes the inflow plane 61 through which the fluid flows into the partitions 44 from the cells 34 (specifically, the open-inlet cell 36). In the honeycomb filter 30 having the above features, when the fluid flow into the honeycomb filter 30 from the inflow plane 61, the trapping capability is increased and the pressure loss after the PM deposition is reduced.

The CPU 22 of the user PC 20 can analyze the microstructure of the porous body by, as described above, deriving the surface layer thickness Ts that is correlated with the trapping capability of the porous body and the pressure loss after the PM deposition. Moreover, the CPU 22 successively shifts the imaginary surface 91 in the thickness direction to define the imaginary surface 91 after each shift as an imaginary reference plane, then identifies, as the surface-layer region start plane 92, the imaginary reference plane in which the straight-pore opening ratio takes the first opening ratio Pref1, and derives the surface layer thickness Ts on condition of excluding a region closer to the imaginary surface 91 than the surface-layer region start plane 92 from the surface layer region. Here, because there are irregularities on the actual surface of the porous body, the surface layer straight-pore voxels near the imaginary surface 91 may often include, as noise, spatial voxels that represent spaces outside the porous body (i.e., spaces not so affecting the trapping capability and the pressure loss) instead of the pores in the porous body. The surface layer thickness Ts can be derived in a way of excluding (ignoring) the spatial voxels, which exist near the imaginary surface 91 and generate noise, by identifying, as the surface-layer region start plane 92, the imaginary reference plane after the shift of the imaginary surface 91 with the first opening ratio Pref1 used as a threshold so that the region on the side closer to the imaginary surface 91 than the surface-layer region start plane 92 is not included in the surface layer region. Hence the correlation between the surface layer thickness Ts and each of the trapping capability of the porous body and the pressure loss after the PM deposition is further increased, and the microstructure of the porous body can be analyzed with higher accuracy. By setting the first opening ratio Pref1 to 97% or more, the possibility of excluding even the surface layer straight-pore voxels which represent pores providing a large influence upon the trapping capability and the pressure loss can be reduced, and the surface layer thickness Ts exhibiting the above-described correlation at a higher level can be derived.

Furthermore, the CPU 22 successively shifts the imaginary surface 91 in the thickness direction to define the imaginary surface 91 after each shift as an imaginary reference plane, then identifies, as the surface-layer region end plane 93, the imaginary reference plane in which the straight-pore opening ratio takes the second opening ratio Pref2, and derives the surface layer thickness Ts on condition of excluding a region on the inner side of the porous body than the surface-layer region end plane 93 in the thickness direction from the surface layer region. Here, for example, when the surface layer straight-pore voxels extend in a single line up to the inner deep side of the porous body, an influence upon the trapping capability and the pressure loss by only those surface layer straight-pore voxels extending in a single line is small. Accordingly, if such a region where the surface layer straight-pore voxels are rarely present is regarded as being included in the surface layer region, the correlation between the derived surface layer thickness Ts and each of the trapping capability of the porous body and the pressure loss after the PM deposition would be reduced. Thus, the surface layer thickness Ts can be derived in a way of excluding (ignoring) such a very small number of surface layer straight-pore voxels, which extend up to the inner deep side of the porous body, by identifying, as the surface-layer region end plane 93, the imaginary reference plane after the shift of the imaginary surface 91 with the second opening ratio Pref2 used as a threshold so that the region on the inner side of the porous body than the surface-layer region end plane 93 is not included in the surface layer region. Hence the correlation between the surface layer thickness Ts and each of the trapping capability of the porous body and the pressure loss after the PM deposition is further increased, and the microstructure of the porous body can be analyzed with higher accuracy. By setting the second opening ratio Pref2 to 0.5% or more, the very small number of surface layer straight-pore voxels extending up to the inner deep side of the porous body can be excluded sufficiently, and the surface layer thickness Ts exhibiting the above-described correlation at a higher level can be derived. By setting the second opening ratio Pref2 to 10% or less, the possibility of excluding even the surface layer straight-pore voxels which represent pores providing a large influence upon the trapping capability and the pressure loss can be reduced, and the surface layer thickness Ts exhibiting the above-described correlation at a higher level can be derived.

It should be appreciated that the present invention is not limited to the above-described embodiment and can be implemented in numerous ways without departing from the technical scope of the present invention.

Figure 12:
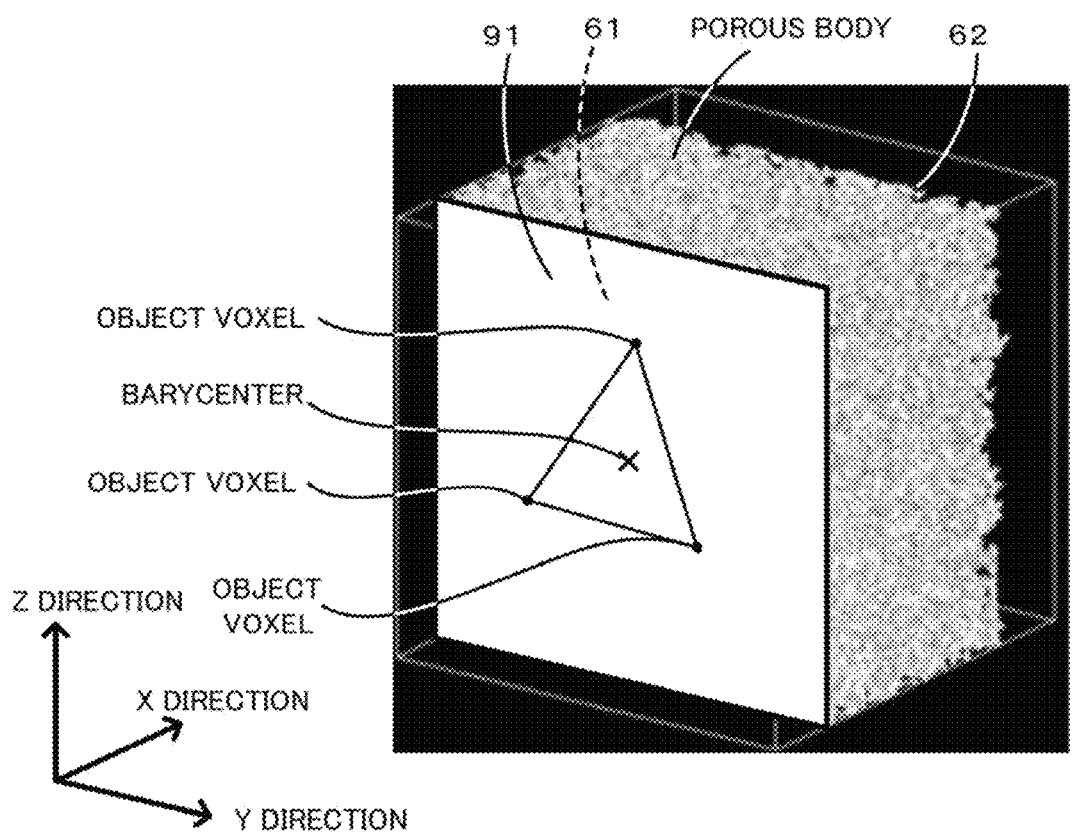
FIG. 12 is an explanatory view illustrating another definition procedure for the imaginary surface 91.

For example, while, in the above embodiment, the imaginary surface 91 is set in the plane parallel to the YZ plane, the present invention is not limited to that embodiment. For example, when the inflow plane 61 is not parallel to the YZ plane and inclined at a certain angle (e.g., 1 to 50), the imaginary surface 91 may be defined as follows. As illustrated in FIG. 12, the imaginary surface 91 may be defined as a plane which is in contact with three or more object voxels present in the surface of the porous body, and in which a triangle formed by connecting at least one set of three points selected from the three or more object voxels includes the barycenter of the above-mentioned surface of the porous body. According to such a manner, since the imaginary surface 91 is defined substantially parallel to the surface of the porous body, the surface layer thickness Ts can be derived with high accuracy. In this case, the thickness direction used in identifying the surface layer straight-pore voxels may be the X direction, but it is preferably set to the direction perpendicular to the imaginary surface 91. Here, a method similar to that used in the above embodiment, i.e., a method of defining, as the imaginary surface 91, a plane parallel to any one of the XY plane, XZ plane, and the YZ plane in the three-dimensional coordinates, is called a first method. A method described above with reference to FIG. 12, i.e., a method of defining, as the imaginary surface 91, a plane which is in contact with three or more object voxels present in the surface of the porous body, and in which a triangle formed by connecting at least one set of three points selected from the three or more object voxels includes the barycenter of the above-mentioned surface of the porous body, is called a second method. In the porous body and the honeycomb filter according to the present invention, it is just required to satisfy the formula (1) when the imaginary surface 91 is defined by at least one of the first method and the second method. In the case of deriving the surface layer thickness Ts by the second method in the porous body and the honeycomb filter according to the present invention, if there are plural candidates of the imaginary surface (i.e., plural planes each of which is in contact with three or more object voxels present in the surface of the porous body, and in each of which a triangle formed by connecting at least one set of three points selected from the three or more object voxels includes the barycenter of the above-mentioned surface of the porous body), one of the candidate planes in which the above-mentioned triangle is maximum is defined as the imaginary surface 91.

Figure 13:
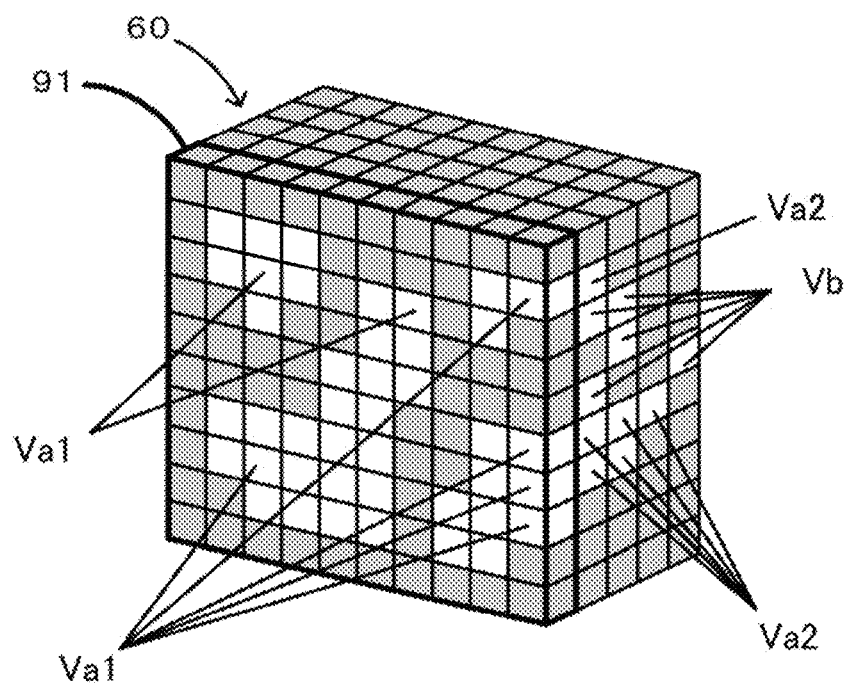
FIG. 13 is an explanatory view illustrating another definition procedure for the imaginary surface 91.

In the embodiment described above, the phrase "the imaginary surface 91 is in contact with the object voxels" means that voxels constituting the imaginary surface 91 are in surface contact with object voxels (refer to FIG. 8). However, the present invention is not limited to that embodiment. For example, the phrase "the imaginary surface 91 is in contact with the object voxels" may be interpreted as involving the case that voxels constituting the imaginary surface 91 include object voxels present in the surface of the porous body (refer to FIG. 13). When identifying the surface layer straight-pore voxels in the above case, spatial voxels having the same X coordinate value as that of the imaginary surface 91 (i.e., spatial voxels in contact with the imaginary surface 91) are all identified as the surface layer straight-pore voxels. In addition, spatial voxels that continuously lie from each of the identified surface layer straight-pore voxel toward the inside of the porous body in the predetermined thickness direction are also identified as the surface layer straight-pore voxels. Similar advantageous effects to those of the above embodiment can also be obtained in the above case. In the process of deriving the surface layer thickness Ts in the porous body and the honeycomb filter according to the present invention, however, the phrase "the imaginary surface 91 is in contact with the object voxels" means that voxels constituting the imaginary surface 91 are in surface contact with object voxels.

While, in the above embodiment, the first opening ratio Pref1 is set to 98%, the present invention is not limited to that embodiment. The first opening ratio Pref1 may be set to be able to appropriately exclude the spatial voxels that exist near the imaginary surface 91 and that generate noise. The first opening ratio Pref1 may be set, for example, to a value of less than 100% and 97% or more. Similarly, the second opening ratio Pref2 may be set to be able to appropriately exclude a very few surface layer straight-pore voxels spatial voxels that extend to the inner deep side of the porous body. The second opening ratio Pref2 may be set, for example, to a value of 10% or less and 0.5% or more. The surface layer thickness Ts may be derived using any suitable method insofar as a length of the surface layer region in the thickness direction, which is defined on the basis of a region where the identified surface layer straight-pore voxels are present, is derived as the surface layer thickness Ts. For example, the surface layer thickness Ts may be derived without defining at least one of the surface-layer region start plane 92 on the basis of the first opening ratio Pref1 and the surface-layer region end plane 93 on the basis of the second opening ratio Pref2. In one example, without identifying the surface-layer region start plane 92, the surface layer thickness Ts may be derived as a distance from the imaginary surface 91 or from a plane passing a voxel adjacent to the imaginary surface 91 on the inner side of the porous body in the thickness direction. Alternatively, without identifying the surface-layer region end plane 93, the surface layer thickness Ts may be derived as a distance to the imaginary inner surface 94 or to a plane passing a voxel adjacent to the imaginary inner surface 94 on the imaginary surface side of the porous body in the thickness direction. In another example, a distance from the imaginary surface 91 to the imaginary inner surface 94 (i.e., a thickness Ta denoted in FIG. 11) may be derived as the surface layer thickness Ts. In the process of deriving the surface layer thickness Ts in the porous body and the honeycomb filter according to the present invention, however, the method described in the above embodiment is to be used. Note that, while the ratio Ts/T is a value less than 1 in the above embodiment, the ratio Ts/T may take a value 1 depending on a method of identifying the surface layer region in some cases, such as a case of setting the thickness Ta to be the surface layer thickness Ts.

In the process of identifying the surface layer straight-pore voxels in the above embodiment, as illustrated in FIG. 8, all spatial voxels that are in contact with the imaginary surface 91 are identified as the surface layer straight-pore voxels. Regarding the spatial voxels that are in contact with the imaginary surface 91, however, only when there are a predetermined number or more of spatial voxels continuously lying toward the inner side of the porous body in the predetermined thickness direction, those spatial voxels may be identified as the surface layer straight-pore voxels (the predetermined number is an integer of 2 or larger). This modification can also provide similar advantageous effects to those of the above embodiment. The surface layer straight-pore voxels may be identified in the above-mentioned manner in the case of FIG. 13 as well. In the process of deriving the surface layer thickness Ts in the porous body and the honeycomb filter according to the present invention, however, the method described in the above embodiment is to be used.

While, in the above embodiment, the CPU 22 identifies the surface-layer region start plane 92 and the surface-layer region end plane 93 after identifying all the surface layer straight-pore voxels, the identifications of those planes may be executed in parallel. For example, the CPU 22 may identify the surface-layer region start plane 92 while repeating the processes of shifting the imaginary surface 91 just by one voxel, identifying the surface layer straight-pore voxels in the imaginary reference surface after the shift, and deriving the straight-pore opening ratio. This is similarly applied to the case of identifying the surface-layer region end plane 93.

While, in the above embodiment, the "imaginary reference plane in which the straight-pore opening ratio takes the first opening ratio Pref1" is given by the imaginary reference plane in which the straight-pore opening ratio becomes the first opening ratio Pref1 or below for the first time, the present invention is not limited to that embodiment. The "imaginary reference plane in which the straight-pore opening ratio takes the first opening ratio Pref1" may be given by an imaginary reference plane in which the straight-pore opening ratio can be regarded as taking the first opening ratio Pref1. For example, the relevant imaginary reference plane may be given by an imaginary reference plane in which the straight-pore opening ratio becomes equal to the first opening ratio Pref1, or an imaginary reference plane preceding, by one shift, the imaginary reference surface in which the straight-pore opening ratio becomes the first opening ratio Pref1 or below for the first time (i.e., an imaginary reference plane in which the straight-pore opening ratio does not become the first opening ratio Pref1 or less and takes a minimum value). Alternatively, the relevant imaginary surface may be given by an imaginary reference plane in which the straight-pore opening ratio takes a value closest to the first opening ratio Pref1. This is similarly applied to the "imaginary reference plane in which the straight-pore opening ratio takes the second opening ratio". In the process of deriving the surface layer thickness Ts in the porous body and the honeycomb filter according to the present invention, however, the method described in the above embodiment is to be used.

In the above embodiment, a catalyst such as an oxidation catalyst (e.g., platinum) may be coated in the pores of the partitions 44 in the honeycomb filter 30 (i.e., on the inner surfaces of the partitions 44). The presence of the catalyst makes it possible to oxidize the trapped PM, and to suppress a decrease in the porosity of the partitions 44 and an abrupt increase of the pressure loss. While the above embodiment is described as not including the catalyst, the surface layer thickness Ts and the porosity P can be derived in a similar manner to that in the above embodiment even when the partitions 44 include the catalyst. Specifically, the catalyst may be regarded as part of the object constituting the partitions 44 (i.e., as an object voxel).

While the above embodiment is described, by way of example, in connection with the honeycomb filter 30, illustrated in FIGS. 1 and 2, including the partitions 44 as the porous body, the shape of the porous body is a matter of choice insofar as the formula (1) is satisfied in the porous body.

EXAMPLES

The cases of actually fabricating honeycomb filters will be described below as Experimental Examples. Experimental Examples 1 to 19 represent the embodiments of the porous body and the honeycomb filter according to the present invention, and Experimental Examples 20 to 25 represent comparative examples. Note that the present invention is not limited to the following examples.

Experimental Example 1

A honeycomb filter of Experimental Example 1 was fabricated as follows. First, a base material was obtained by preparing talc powder and alumina, each having an average particle size of 12 μm, as the cordierite-like raw material, preparing zirconium oxide ($ZrO_2$) as an auxiliary raw material, and by mixing those raw materials with one another. A mass ratio of the zirconium oxide ($ZrO_2$) to the talc powder was set to 1.75%. A mass ratio of the alumina to the talc powder was set to 20%. The non-surface layer clay was obtained by mixing the base material, obtained as described above, with a pore-forming material (starch) having an average particle size of 30 μm at a mass ratio of 100:30, adding methylcellulose as an organic binder and an appropriate amount of water to the above mixture, and by further mixing them. Apart from the non-surface layer clay, the surface layer clay satisfying the formula (1) was obtained by preparing and mixing the base material, which contained the cordierite-like raw material, and the pore-forming material, adding an organic binder and water to the above mixture, and by further mixing them. A mass ratio of the base material and the pore-forming material in the surface layer clay was set to 100:27.003 as indicated in Table 1. Then, the non-surface layer clay was extruded using a predetermined die to form a compact having the same shape as that of the partitions 44 illustrated in FIGS. 1 and 2, but being thinner than the thickness T of the partitions 44 (i.e., a compact corresponding to the non-surface layer portion). The compact had an external shape of a quadrangular prism. After drying the formed compact with microwaves and further with hot air, the compact was subjected to a sealing process.

The sealing process was carried out in a manner of alternately masking cell openings in one end surface of the compact, and dipping the masked end surface in sealing slurry (that is the same as the above-mentioned non-surface layer clay), thus providing the end surface in which openings and sealed portions are arranged alternately. Furthermore, the other end surface of the compact was masked, and sealed portions were formed in a similar manner to provide the sealed portions (i.e., the inlet sealing material 42 and the outlet sealing material 38) such that a cell opened at one end and sealed at the other end and a cell sealed at one end and opened at the other end were arranged alternately. Then, the sealed portions were dried. The compact after the sealing process was dipped in the surface layer clay to coat portions of surfaces of the compact, which correspond to the inner peripheral surfaces of the open-inlet cells 36, with the surface layer clay. The compact was then dried. The dried compact was subjected to calcination in an oxidizing atmosphere at 550° C. for 3 hours, and then to main firing in an inert atmosphere under conditions of 1430° C. for 2 hours. The compact after the main firing was ground into the shape of a circular cylinder. Thereafter, an outer periphery of the circular cylindrical compact was covered with slurry adapted for coating the outer periphery. The slurry was prepared by kneading an aluminosilicate fiber, colloidal silica, polyvinyl alcohol, SiC, and water together. The outer periphery protective portion 32 was formed by hardening the coated slurry through drying. As a result, the honeycomb filter of Experimental Example 1 was obtained. Here, the honeycomb filter had a section with a diameter of 118.4 mm and a length of 127 mm, and a cell density of 360 cells/square inch.

Experimental Examples 2 to 5

In each of Experimental Examples 2 to 5, a honeycomb filter was fabricated in a similar manner to that in Experimental Example 1 except for changing the surface layer clay as appropriate. In any of Experimental Examples 2 to 5, the base material in the surface layer clay also contained the cordierite-like raw material. Individual values of the mass ratio of the base material and the pore-forming material in the surface layer clay used in Experimental Examples 2 to 5 were as per denoted in Table 1.

Experimental Example 6

In Experimental Example 6, a honeycomb filter was fabricated in a similar manner to that in Experimental Example 1 except for changing material properties of the non-surface layer clay and the surface layer clay. In Experimental Example 6, a base material was prepared by mixing SiC powder having an average particle size of 40 μm and metal Si powder having an average particle size of 4 μm at a mass ratio of 80:20. The prepared base material and a pore-forming material (starch), which had an average particle size of 30 μm, were mixed at a mass ratio of 100:30. Methylcellulose as an organic binder and an appropriate amount of water were added to the above mixture, and the non-surface layer clay was obtained by mixing them. Apart from the non-surface layer clay, the surface layer clay was prepared by preparing and mixing a base material, which contained SiC powder and metal Si powder, and a pore-forming material, adding an organic binder and water to the above mixture, and by mixing them. A value of the mass ratio of the base material and the pore-forming material in the surface layer clay was as per denoted in Table 1.

Experimental Examples 7 to 25

In each of Experimental Examples 7 to 25, a honeycomb filter was fabricated in a similar manner to that in Experimental Example 6 except for changing the surface layer clay as appropriate. In any of Experimental Examples 7 to 25, the base material in the surface layer clay also contained the SiC powder and the metal Si powder. Individual values of the mass ratio of the base material and the pore-forming material in the surface layer clay used in Experimental Examples 7 to 25 were as per denoted in Table 1.

[Fabrication of Microstructure Analyzer]

A microstructure analyzer for evaluating Experimental Examples 1 to 25 was fabricated. First, an analysis processing program providing the functions of the above-described embodiment was prepared. Then, the prepared program was stored in a HDD of a computer including a controller equipped with a CPU, a ROM, and a RAM, as well as the HDD. The microstructure analyzer was thus fabricated.

[Analysis of Microstructure]

Among pixel data obtained by subjecting the partitions 44 (porous body) of the honeycomb filter of Experimental Example 1 to a CT scan, one set of data with a size in the X direction being the same as the thickness of the partition 44 in the passing direction of the exhaust gas (i.e., the thickness T), with a length of 480 μm (=1.2 μm×400 voxels) in the Y direction, and with a length of 480 μm (=1.2 μm×400 voxels) in the Z direction was extracted and stored, as the above-described porous-body data 60, in the HDD of the microstructure analyzer. The above-described analysis processing routine was then executed on the stored porous-body data 60. Analysis result data including the surface layer thickness Ts, the porosity P, and the good/no-good result was thus obtained. For each of Experimental Examples 2 to 25, analysis result data was obtained in a similar manner. Note that the porous-body data 60 was given by extracting, among image data obtained with the CT scan, data corresponding to a region including the inflow plane 61 and the outflow plane 62 of the partition 44 like the region 50 in FIG. 2. The CT scan was performed on condition that the inflow plane 61 was arranged parallel to the YZ plane as much as possible.

[Evaluation of Trapping Capability]

The trapping capability was evaluated for Experimental Examples 1 to 25. Specifically, first, a center point of each voxel in the porous-body data 60 was set as each lattice point, and a fluid analysis was performed in accordance with the lattice Boltzmann method using a predetermined relational expression with respect to a flow of a fluid between each lattice point and another adjacent lattice point when the fluid flowed into the porous body from the inflow plane 61. On the basis of the result of the fluid analysis, a flow velocity vector was derived, as information regarding the fluid flow per spatial voxel, from the flow velocity and the flow direction for each of spatial voxels in the porous-body data 60. Subsequently, a motion of PM was estimated by simulating a state of PM moving with the fluid flow expressed by the flow velocity vector. In the estimation, PM having come close to an object voxel was regarded as being trapped on the relevant object voxel, and the number of leaked PM was obtained by counting the number of PM having flowed out from the outflow plane 62 of the porous-body data 60 without being trapped. A PM leakage amount [g/m$^3$] was then derived on the basis of the counted number of leaked PM. The PM leakage amount was derived in terms of weight

[g] of PM having leaked (namely, having flowed out from the outflow plane 62) per unit volume [m³] of the partition 44. The trapping capability was evaluated to be good (A) when the derived PM leakage amount was 0 g/m³ or more and less than 1.5 g/m, to be allowable (B) when it was 1.5 g/m³ or more and less than 4.0 g/m³, and to be no-good (F) when it was 4.0 g/m³ or more.

[Evaluation of Pressure Loss]

The pressure loss after the PM deposition was evaluated for Experimental Examples 1 to 25. Specifically, to start with, simulation data for a PM deposition state after supplying a fluid to flow through the partition 44 for 0.04 sec was prepared on the basis of the porous-body data 60. Such simulation data was prepared as follows. First, as in the above-described evaluation of the trapping capability, a motion of PM was estimated by simulating a state of PM moving with the fluid flow expressed by the flow velocity vector that was derived in accordance with the lattice Boltzmann method. Here, it was assumed that the fluid contained 1 g of PM (particle size: 80 μm) per 1 m³. A state of the fluid flowing for a period of 0.04 sec was then simulated. PM having come close to an object voxel during such a period was regarded as being trapped on the relevant object voxel, and a spatial voxel adjacent to the relevant object voxel was defined as a PM deposition voxel. The PM deposition voxel was assumed to be a voxel having a predetermined permeation resistance higher than that of the spatial voxel. In such a manner, the simulation data for the PM deposition voxel was prepared. Next, the pressure loss [Pa] was derived with respect to the porous-body data 60 simulating the PM deposition state. The pressure loss was derived by a known method of performing a fluid analysis in accordance with the lattice Boltzmann method on condition that, as described above, the predetermined permeation resistance was set for the PM deposition voxel in the porous-body data 60 simulating the PM deposition state, and result. When a value of the pressure loss was 0 Pa or more and less than 150 Pa, the pressure loss was determined to be good (A). When it was 150 Pa or more and less than 250 Pa, the pressure loss was determined to be allowable (B), and when it was 250 Pa or more, the pressure loss was determined to be no-good (F).

Table 1 lists, for Experimental Examples 1 to 25, the mass ratio between the base material and the pore-forming material in the surface layer clay, the porosity P, the thickness T of the partition 44, the surface layer thickness Ts, a value (p/Ts) resulting from dividing the porosity P by the surface layer thickness Ts, the analysis result obtained with the microstructure analyzer, the evaluation result of the pressure loss, the evaluation result of the trapping capability, and overall evaluation of both the pressure loss and the trapping capability. The analysis result obtained with the microstructure analyzer was indicated by "S" when the results was "even better" (namely, the formula (2) was satisfied), and by "F" when the result was "no-good" (namely, the formula (1) was not satisfied). The overall evaluation was rated as follows. The overall evaluation was "F" (no-good) when the evaluation of one of the pressure loss and the trapping capability was "F" (no-good). The overall evaluation was also "F" (no-good) when the evaluations of both the pressure loss and the trapping capability were "B" (allowable). In other cases, both the pressure loss and the trapping capability were "B" (allowable). In other cases, the overall evaluation was rated to be "A" (good).

TABLE 1

| | The mass ratio in the surface layer clay The base material:The pore-forming material | The porosity P [%] | The thickness T [μm] | The surface layer thickness Ts [μm] | P/Ts | The analysis result | The evaluation result of the pressure loss | The evaluation result of the trapping capability | Overall evaluation |
|---|---|---|---|---|---|---|---|---|---|
| EXAMPLE1 | 100:27.003 | 57.4 | 318.0 | 74.4 | 0.771 | S | A | A | A |
| EXAMPLE2 | 100:17.882 | 49.7 | 313.2 | 68.4 | 0.726 | S | A | A | A |
| EXAMPLE3 | 100:23.397 | 54.3 | 297.6 | 67.2 | 0.808 | S | A | A | A |
| EXAMPLE4 | 100:24.678 | 55.4 | 292.8 | 48.0 | 1.154 | S | A | A | A |
| EXAMPLE5 | 100:32.982 | 62.4 | 302.4 | 19.2 | 3.250 | S | A | A | A |
| EXAMPLE6 | 100:14.015 | 46.4 | 309.6 | 68.4 | 0.679 | S | A | A | A |
| EXAMPLE7 | 100:8.143 | 41.5 | 296.4 | 64.8 | 0.640 | S | B | A | A |
| EXAMPLE8 | 100:21.049 | 52.3 | 294.0 | 75.6 | 0.692 | S | A | A | A |
| EXAMPLE9 | 100:11.915 | 44.6 | 318.0 | 58.8 | 0.759 | S | B | A | A |
| EXAMPLE10 | 100:27.051 | 57.4 | 322.8 | 81.8 | 0.703 | S | A | A | A |
| EXAMPLE11 | 100:6.565 | 40.1 | 310.8 | 54.0 | 0.743 | S | B | A | A |
| EXAMPLE12 | 100:15.592 | 47.7 | 256.8 | 75.6 | 0.631 | S | A | B | A |
| EXAMPLE13 | 100:24.370 | 55.1 | 301.2 | 79.2 | 0.696 | S | A | A | A |
| EXAMPLE14 | 100:36.185 | 65.1 | 301.2 | 90.0 | 0.723 | S | A | B | A |
| EXAMPLE15 | 100:0.259 | 30.8 | 291.6 | 44.4 | 0.694 | S | B | A | A |
| EXAMPLE16 | 100:8.190 | 41.5 | 288.0 | 30.0 | 1.383 | S | B | A | A |
| EXAMPLE17 | 100:39.743 | 88.1 | 292.8 | 79.2 | 0.860 | S | A | A | A |
| EXAMPLE18 | 100:0.002 | 26.2 | 298.8 | 9.6 | 2.729 | S | B | A | A |
| EXAMPLE19 | 100:14.477 | 46.8 | 322.8 | 14.4 | 3.250 | S | A | A | A |
| EXAMPLE20 | 100:28.973 | 59.0 | 288.0 | 112.8 | 0.523 | F | A | F | F |
| EXAMPLE21 | 100:0.694 | 35.2 | 301.2 | 102.0 | 0.345 | F | F | B | F |
| EXAMPLE22 | 100:30.882 | 60.6 | 285.6 | 147.8 | 0.411 | F | A | F | F |
| EXAMPLE23 | 100:0.860 | 35.3 | 300.0 | 68.4 | 0.516 | F | F | A | F |
| EXAMPLE24 | 100:35.402 | 64.4 | 295.2 | 121.2 | 0.532 | F | A | F | F |
| EXAMPLE25 | 100:13.196 | 45.7 | 256.8 | 85.2 | 0.537 | F | B | B | F |

[Relationships Among Surface Layer Thickness Ts, Porosity P, and Overall Evaluation]

Figure 14:
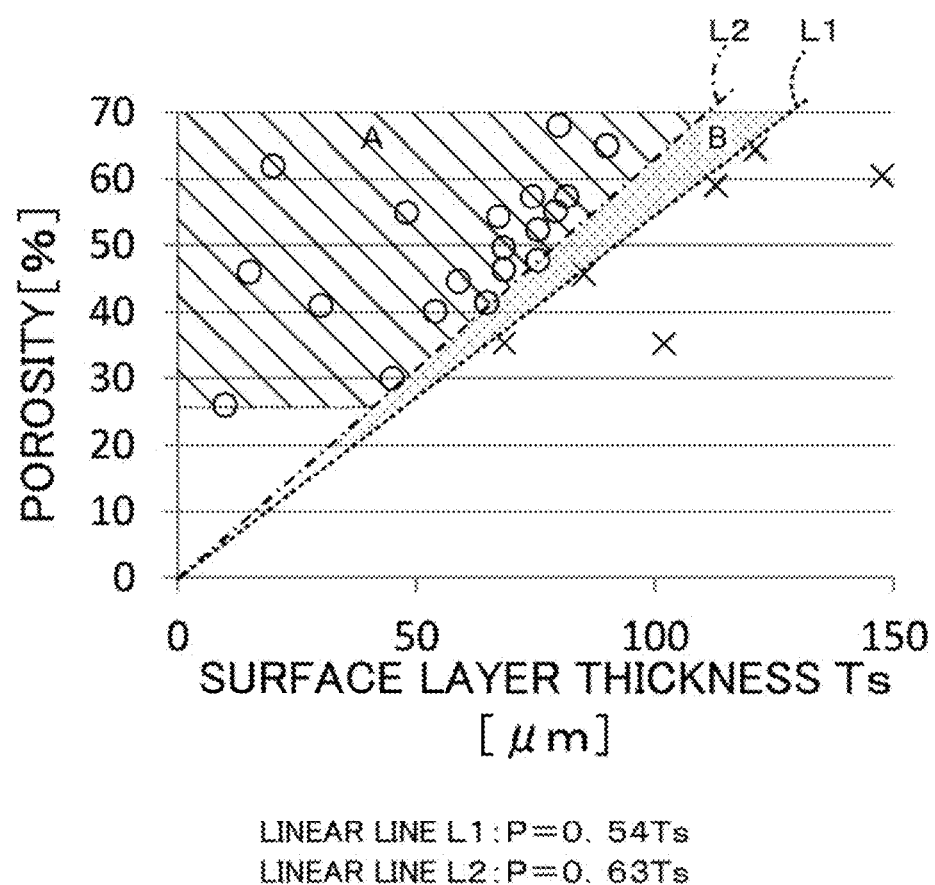
FIG. 14 is a graph plotting relationships between a surface layer thickness Ts and a porosity P in Experimental Examples 1 to 25.

FIG. 14 is a graph plotting relationships between the surface layer thickness Ts and the porosity P in Experimental Examples 1 to 25, which are listed in Table 1. A mark "○" or "×" at each plotted point represents the overall evaluation of the corresponding Experimental Example ("○" in FIG. 14 corresponds to "A" which means good, "×" in FIG. 14 corresponds to "F" which means no-good). FIG. 14 further denotes a linear line L1 (representing P=0.54 Ts), and a linear line L2 (representing P=0.63 Ts).

As will be seen from Table 1 and FIG. 14, in any of Experimental Examples 1 to 19, the formula (1) was satisfied, i.e., P/Ts≥0.54. In any of Experimental Examples 1 to 19, the formula (2) was further satisfied, i.e., P/Ts≥0.63, and the analysis result was "S" (even better). Moreover, in any of Experimental Examples 1 to 19, the overall evaluation was "A" (good). In any of Experimental Examples 20 to 25, the formula (1) was not satisfied; namely, P/Ts<0.54, and the analysis result was "F" (no-good). Moreover, in any of Experimental Examples 20 to 25, the overall evaluation was "F" (no-good). From those results, it was confirmed that the trapping capability increases and the pressure loss after the PM deposition reduces at a smaller value of the surface layer thickness Ts. It was also confirmed that an upper limit value of the appropriate surface layer thickness Ts increases at a larger value of the porosity P.

A linear line L1 was defined as a linear line passing just on the left side of the plotted points corresponding to Experimental Examples 20 to 25 in FIG. 14 (and representing a relatively just smaller value of the surface layer thickness Ts). A linear line L2 was defined as a linear line passing just on the right side of the plotted points corresponding to Experimental Examples 1 to 19 in FIG. 14 (and representing a relatively just larger value of the surface layer thickness Ts).

A porous body having the porosity P of 25% or more is relatively easy to manufacture, and a porous body having the porosity P of 70% or less has sufficiently high strength. It is hence deemed that, in the porous body, the porosity P preferably falls within a range of 25% or more and 70% or less and satisfies the formula (1) (namely, it falls within a region A or a region B in FIG. 14). Furthermore, it is deemed that, in the porous body, the porosity P more preferably falls within a range of 25% or more and 70% or less and satisfies the formula (2) (namely, it falls within the region A in FIG. 14). In any of Experimental Examples 1 to 19, the porosity P falls within the region A.

The Present application claims priority from Japanese Patent Application No. 2016-070889, filed on Mar. 31, 2016, the entire contents of which are incorporated herein by reference.

What is claimed is:

1. A ceramic honeycomb filter comprising a porous body including a porous base material having a major surface and a porous surface layer formed on the major surface of the base material, wherein the porous body has a porosity P [%] in the range of 25%<P<70% and a thickness T in the range of from 100 μm or more to 600 μm or less and the surface layer has a thickness Ts>0 μm, wherein the surface layer thickness Ts and the porosity P of the porous body satisfy a following formula (1):

$$P \geq 0.54 \, Ts \quad (1)$$

wherein, the surface layer thickness Ts is determined by collecting porous-body data in which positional information providing a position of a voxel is associated with voxel type information including information that allows determination as to whether the voxel is a spatial voxel representing a space or an object voxel representing an object is prepared through three-dimensional scanning of a region including a surface of the porous body, and then performing the following steps using the porous-body data;

(a) a step of defining an imaginary surface that is in contact with at least one object voxel present in the surface of the porous body, (b) a step of identifying, as surface layer straight-pore voxels, spatial voxels in contact with the imaginary surface and spatial voxels that continuously lie from the imaginary surface toward an inside of the porous body in a thickness direction, which is perpendicular to the imaginary surface and which extends toward the inside of the porous body, and (c) a step of successively shifting the imaginary surface in the thickness direction to define the imaginary surface after each shift as an imaginary reference surface, identifying, as a surface-layer region start plane, an imaginary reference plane in which a straight-pore opening ratio denoting a proportion of the surface layer straight-pore voxels occupying the imaginary reference surface becomes 98% or below for first time, identifying, as a surface-layer region end plane, an imaginary reference plane in which the straight-pore opening ratio becomes 1% or below for first time, and deriving, as a surface layer thickness Ts, a distance between the surface-layer region start plane and the surface-layer region end plane in the thickness direction.

2. The ceramic honeycomb filter according to claim 1, wherein a following formula (2) is satisfied:

$$P \geq 0.63 \, Ts \quad (2).$$

3. The ceramic honeycomb filter according to claim 1, further comprising a plurality of partitions, each of which includes the porous body, and which form a plurality of cells serving as paths of a fluid, wherein the major surface of the porous body constitutes an inflow plane through which the fluid flows into the partition from the cell.

4. The ceramic honeycomb filter according to claim 1, wherein the difference between the porous body thickness T and the surface layer thickness Ts (T−Ts) is 100 μm or more and 300 μm or less.

5. The ceramic honeycomb filter according to claim 1, wherein the ratio between the surface layer thickness Ts and the porous body thickness T (Ts/T) is 0.1 or more and 0.5 or less.

* * * * *